United States Patent
Hebron et al.

(10) Patent No.: US 10,523,687 B2
(45) Date of Patent: Dec. 31, 2019

(54) METHOD AND APPARATUS FOR SUPPORTING SUB NETWORKS IN A MOCA NETWORK

(71) Applicant: ENTROPIC COMMUNICATIONS, LLC, Carlsbad, CA (US)

(72) Inventors: Yoav Hebron, San Diego, CA (US); Zong Liang Wu, San Diego, CA (US); Na Chen, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

(21) Appl. No.: 15/312,973

(22) PCT Filed: Apr. 28, 2015

(86) PCT No.: PCT/US2015/027899
§ 371 (c)(1),
(2) Date: Nov. 21, 2016

(87) PCT Pub. No.: WO2015/179076
PCT Pub. Date: Nov. 26, 2015

(65) Prior Publication Data
US 2017/0093883 A1    Mar. 30, 2017

Related U.S. Application Data

(60) Provisional application No. 62/001,477, filed on May 21, 2014.

(51) Int. Cl.
*H04L 9/00* (2006.01)
*H04L 29/06* (2006.01)
(Continued)

(52) U.S. Cl.
CPC ............ *H04L 63/123* (2013.01); *H04L 12/28* (2013.01); *H04L 12/6418* (2013.01);
(Continued)

(58) Field of Classification Search
CPC .................................................. H04L 12/2807
See application file for complete search history.

(56) References Cited

U.S. PATENT DOCUMENTS 8,085,802 B1    12/2011  Monk et al.
2005/0278527 A1*  12/2005  Liao .................... G06F 21/6209
                                                                713/165
(Continued)

OTHER PUBLICATIONS

International Search Report and Written Opinion corresponding to International Patent Application No. PCT/US2015/27899, dated Sep. 23, 2015.
(Continued)

*Primary Examiner* — Josnel Jeudy
(74) *Attorney, Agent, or Firm* — McAndrews, Held Malloy, Ltd.

(57) ABSTRACT

Systems and methods for communicating content between nodes of a network, wherein particular nodes of the network are members of a sub network. Flows can be admitted to a subnetwork, depending upon available bandwidth as allocated to the sub networks of the network. Each sub network has a unique password when privacy is enabled on the sub network.

20 Claims, 8 Drawing Sheets

(51) Int. Cl.
*H04L 12/64* (2006.01)
*H04L 12/28* (2006.01)
*H04L 29/08* (2006.01)

(52) U.S. Cl.
CPC .......... *H04L 63/061* (2013.01); *H04L 63/083* (2013.01); *H04L 67/141* (2013.01)

(56) References Cited

U.S. PATENT DOCUMENTS

| | | | |
|---|---|---|---|
| 2008/0247334 A1* | 10/2008 | Lee | H04L 12/2807 370/255 |
| 2009/0092154 A1 | 4/2009 | Malik et al. | |
| 2010/0158021 A1 | 6/2010 | Kliger et al. | |
| 2011/0173435 A1* | 7/2011 | Liu | H04L 63/061 713/150 |
| 2011/0191224 A1 | 8/2011 | Wood et al. | |

OTHER PUBLICATIONS

PCT International Preliminary Report dated Dec. 1, 2016 for PCT Patent Application No. PCT/US2015/027889.

\* cited by examiner

METHOD AND APPARATUS FOR SUPPORTING SUB NETWORKS IN A MOCA NETWORK

CROSS-REFERENCE TO RELATED APPLICATION/INCORPORATION BY REFERENCE

This application is a 371 of International Patent Application No. PCT/US2015/027899, filed Apr. 28, 2015, entitled "METHOD AND APPARATUS FOR SUPPORTING SUB NETWORKS IN A MOCA NETWORK", which claims priority to U.S. Provisional Patent Application No. 62/001,477, filed May 21, 2014, entitled "METHOD AND APPARATUS FOR SUPPORTING SUB NETWORKS IN A MOCA NETWORK". The above-identified applications are hereby incorporated herein by reference in their entirety.

TECHNICAL FIELD

The disclosed method and apparatus relates to networking and more particularly to means for establishing and maintaining sub networks in a MoCA network.

BACKGROUND

It is common today for people to share information and entertainment content throughout their homes over networks that connect various devices within the home. For example, many people share entertainment content through a local area network (LAN) fashioned as a "mesh network". A mesh network provides a connection between nodes of the network, whereby each node can communicate with each other node of the network. One such network is the well-known MoCA network which operates in accordance with an industry standard known as MoCA 2.0 published by the Multimedia over Coax Alliance MoCA©.

FIG. 1 is a simplified illustration of a home 100 that has a MoCA network 106. In the example shown in FIG. 1, the MoCA network 106 has four nodes 110, 112, 114, 116. The nodes of the network 106 are all coupled to a coaxial cable that serves as a medium 128. Typically, the medium 128 within a home 100 is coupled to all four of the nodes 110, 112, 114, 116 of the network.

At times, it is desirable to ensure that information sent from one particular node to another can be sent with no more than a predetermined latency (i.e., time between the information being available to be sent and being received). For example, a person can record programming content, such as a movie, on a first node, such as a digital video recorder (DVR) located in the person's living room. If that person would like to watch the movie on a second node, such as a DVR located in the person's bedroom, it is necessary to ensure that the information can flow from the first node to the second node at a rate that will ensure a steady and uninterrupted display of the movie at the second node. The MoCA specification allows a stream of related information to be designated as a "Parameterized Quality of Service (PQoS) flow". A PQoS Flow is a stream of information flowing from one node to another in which parameterized performance requirements of the flow are guaranteed. In order to guaranty the parameterized performance requirements of the flow, PQoS Flows are admitted to the network. Accordingly, a PQoS Flow is identified by a list of parameters which are specified when the flow is admitted to the network, at which time the resources required for supporting that flow are reserved in order to guaranty their availability.

In some networks, some nodes within the network are more likely to communicate with other particular nodes within the network. In some such cases, it may be desirable to restrict access to certain nodes within the network or to allow certain flows of data to be admitted in a way that they are available to a limited subset of the nodes of the network. Furthermore, it may be desirable to be able to allocate resources (e.g., bandwidth on the network) to a subset of nodes of the network separately from the allocation of resources to other nodes. In this way, PQoS Flows between some nodes can be admitted if the nodes of the subset have not used all of their allocated resources independent of the amount of resources requested by other nodes of the network. Furthermore, it may be desirable to maintain different privacy considerations for (i.e., access to) content provided by an OSP (e.g., video content) and content of a home owner.

Accordingly, there is presently a need for a mechanism to establish sub networks within a main network to allow resources to be available for allocation to nodes within the sub network without regard for the needs of the remainder of the nodes of the main network.

SUMMARY

Various embodiments are presented which allow sub networks to be established within a main network. Establishing such sub networks allows resources to be allocated to flows between nodes of the sub network to ensure that flows between those nodes can access the resources allocated to the sub network no matter what demands for resources are placed on the network by nodes that are not in the sub network.

Throughout this disclosure, the names of MoCA messages are indicated with initial capital, in bold and italics. The names of fields within a frame or Information Element (IF) are all caps. IEs are presented with initial caps.

In accordance with one embodiment of the disclosed method and apparatus, when a node joins an existing network or establishes a new network, the node indicates whether it is part of a sub network and whether it is a Secured Preferred Network Coordinator (SPNC). In accordance with one embodiment, an SPNC is ranked highest for selection as the NC for the network. Once at least two nodes indicate that they are nodes of a sub network, the sub network begins functioning under control of the NC, assuming the NC is an SPNC.

Since the SPNC is ranked highest for selection as the NC, when a new node joins the network and indicates that it is a SPNC, a handoff of control to the new node will occur if the existing NC is not an SPNC. In accordance with one embodiment, the management entity associated with the SPNC can determine the number of sub networks that will be supported in the network. Each sub network is identified by a sub network ID. Therefore, in one embodiment, each sub network can have a unique password. Admission of PQoS Flows to a sub network is restricted to only those PQoS Flows between nodes that are part of the sub network. Nonetheless, PQoS Flows between any two or more nodes in the network can be admitted to the main network.

A sub network can operate with privacy even when the main network does not have privacy enabled. Privacy ensures that flows are encrypted using a key that is only available to nodes of the sub network. When the main network has privacy enabled and the sub network has privacy disabled, flows in the sub network will operate under the privacy restraints that are required of flows in the main network. In accordance with one embodiment of the disclosed method and apparatus, the same Salt is used for passwords in the main network and each sub network. In an alternative embodiment, a different Salt can be used for one or more of the subnetworks.

During admission of a new node, the new node notifies the other nodes of the network that it is a SPNC. Once admitted, the new existing node (EN) gets Advance Encryption Standard (AES) keys that are necessary to communicate over the main network. The NC of the network gives the new EN a predetermined amount of time to communicate over the main network so it can authenticate itself and get the password if needed (i.e., if privacy is enabled in the main network). In an alternative embodiment, the EN may not require additional time. In one embodiment, at the end of the predetermined time, the NC will know (e.g., be informed by a security server) regarding which sub networks the new EN can join.

If there are active sub networks, the NC sends a newly defined Layer 2 Maintenance Entity (L2ME) message with the information about the sub networks that the new EN can join and gets the response from the new EN and each other node. In this way, each node of the main network will have a list of the nodes in each sub network. If the sub network to which the new EN is joining has privacy enabled, then the initial key acquisition of the sub networks follows for each of the sub networks with privacy enabled. After completion of the exchange of all of the AES keys for all of the sub networks, the NC activates the encryption by setting the Sub Networks AES In-Use flag in a MAP (Media Access Plan) message indicating that the encryption of the sub networks is active. Once the new EN sees this MAP, it can start sending encrypted packets over the sub network. In one embodiment, the management entity of the node controls whether the node is allowed to send any traffic, intended for a sub network, over the main network.

Bandwidth (BW) is allocated between the main network and the sub networks under the control of the management entity of the NC. In one embodiment, BW to be allocated to the sub networks is allocated as a single allocation shared by all of the sub networks. Accordingly, the management entity determines the difference between the amount of BW allocated to the sub networks and the total available BW that remains available for use by the main network. In one embodiment, one value (SN_BW) is used to indicate the amount of BW to be allocated to all the sub networks. There is no separate allocation of BW per sub network.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
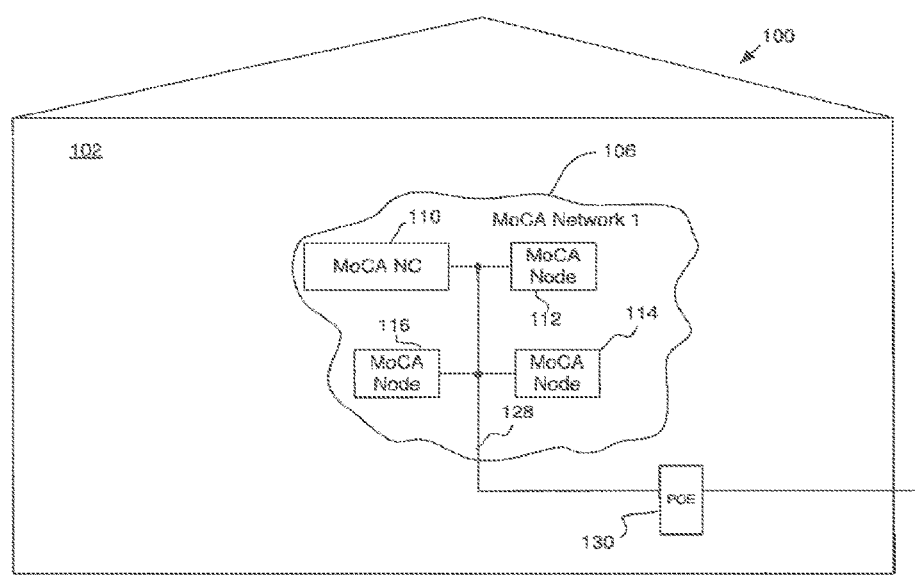
FIG. 1 is a simplified illustration of a home having a MoCA a network.
Figure 2:
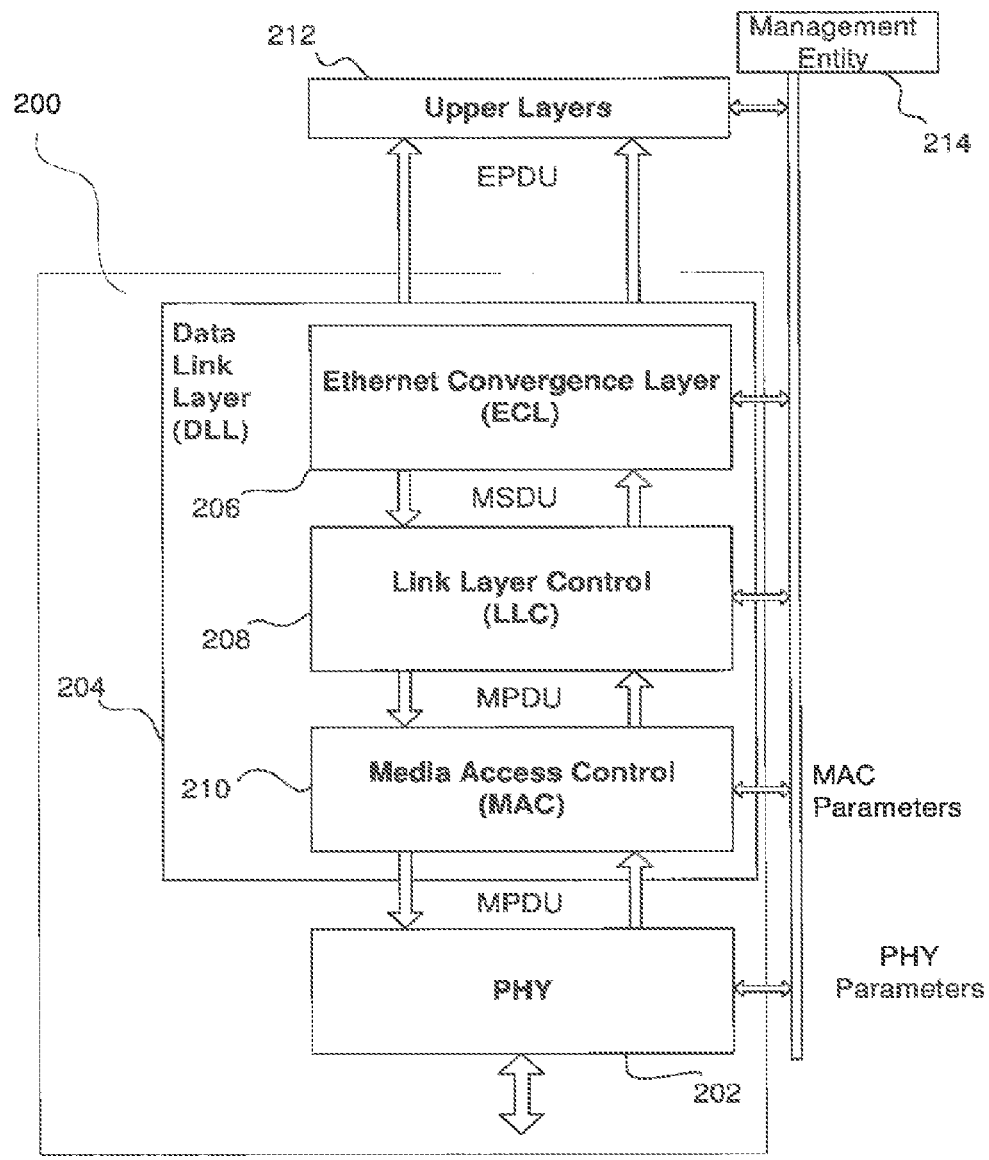
FIG. 2 is a logical block diagram of a node of a network, in accordance with the presently disclosed method and apparatus.

FIG. 2 is a logical block diagram of a node 200 of a network, in accordance with the presently disclosed method and apparatus. Nodes may function in a manner that is appropriate to the role that node is currently playing. For example, a node 200 can assume the role of the Network Coordinator (NC), a New Node (NN) or an Existing Node (EN). The functions of each node are disclosed below in order to understand how the node 200 functions in its role in accordance with the present disclosed method and apparatus.

The node 200 essentially uses the well-known seven layer Open System Interconnection model (OSI). Accordingly, the node 200 comprises a physical layer 202 which is responsible for controlling the physical interface to the medium, including transmitting signals over the medium (e.g., coaxial cable). A Data Link Layer (DLL) 204 includes several sub-layers, such as an Ethernet Convergence Layer (ECL) 206, Link Layer Control (LLC) 208, Media Access Control (MAC) 210, the details of which are not necessary for an understanding of the presently disclosed method and apparatus and are well-known to those skilled in the art. The DLL 204 is responsible for controlling the high layer operation of the physical layer and determining the timing and management of messages to be transmitted and received. Accordingly, the DLL 204 works with the physical layer 202 to perform the functions noted in FIGS. 3-7. In one embodiment of the disclosed method and apparatus, the DLL 204 is implemented by the execution of software running on at least one processor.

In accordance with one embodiment of the disclosed method and apparatus, a Management Entity (ME) 214 is a high layer logical device associated with the node 200. The ME 214 uses the node 200 to send and receive information over the network. One way in which the ME 214 passes information and commands to and from the node 200 is through a bank of control parameters. Some of the control parameters used in accordance with the presently disclosed method and apparatus are listed below. The operations associated with each of these control parameters will be discussed in detail further below. However, the following is an introduction to each of the control parameters associated with the presently disclosed method and apparatus. Their use will become clear in the context of the disclosure provided below.

A first control parameter is $SN\_MBRSHIP_{NODE}$. This control parameter is a read/write control parameter. Read/write control parameters are used to pass information between a node 200 and the associated ME 214 indicating the sub networks of which the node 200 should become a member.

A second control parameter is $SN\_MAIN\_NTWRK_{REC}$. This control parameter is a read/write control parameter. This control parameter is used to control whether a Node which is a member of one or more sub networks should receive or drop data MAC Protocol Data Units (MPDUs) transmitted to the Node over the main network.

A third control parameter is $SN\_MBRSHIP_{NETWORK}$. This control parameter is a read/write control parameter. It is used to provide a list of active sub networks in the network that the Node should manage when it is the NC and only when it is a Secured Preferred NC (SPNC). The entry for each sub network includes the sub network name, privacy Enabled/Disabled, the password, and the list of the Global Unique IDentifier (GUIDs) values for nodes that can be members of the sub network, or an indication that all nodes that could be members.

A fourth control parameter is $SN\_PR\_FLOW_{ASSIGN}$. This control parameter is a read/write control parameter that lists the assignment of Prioritized Flows to sub networks for Flows that could be assigned to multiple sub networks. Each entry on the list includes the sub network name, the MoCA priority of the Flow, and the MAC Destination Address (DA) of the MAC Service Data Units (MSDUs) belonging to the Flow.

A fifth control parameter is SN_BW. This control parameter is a read/write control parameter that indicates the portion of the MAP cycle available data bandwidth that is available to Node belonging to one or more sub-networks. This control parameter is only applicable when the Node is the NC and is a SPNC.

The sixth control parameter is SPNC_HANDOFF. This control parameter is a read/write control parameter that controls whether a Node configured as SPNC should limit NC handoffs to only other SPNC Nodes.

A seventh control parameter is $NETWORK\_IE_{REC}$. This is an event control parameter. Event control parameters allow the node and the ME 214 to pass information regarding process. For example, this particular control parameter is used to report that the Node has received a Network Information Element (IE) with TYPE=0xFF, which is available through the parameter $NETWORK\_IE_{PAYLOAD}$.

An eighth control parameter is $NETWORK\_IE_{PAYLOAD}$. This is a read/write control parameter that holds the IE payload of the latest received Network IE with TYPE=0xFF.

Figure 3:
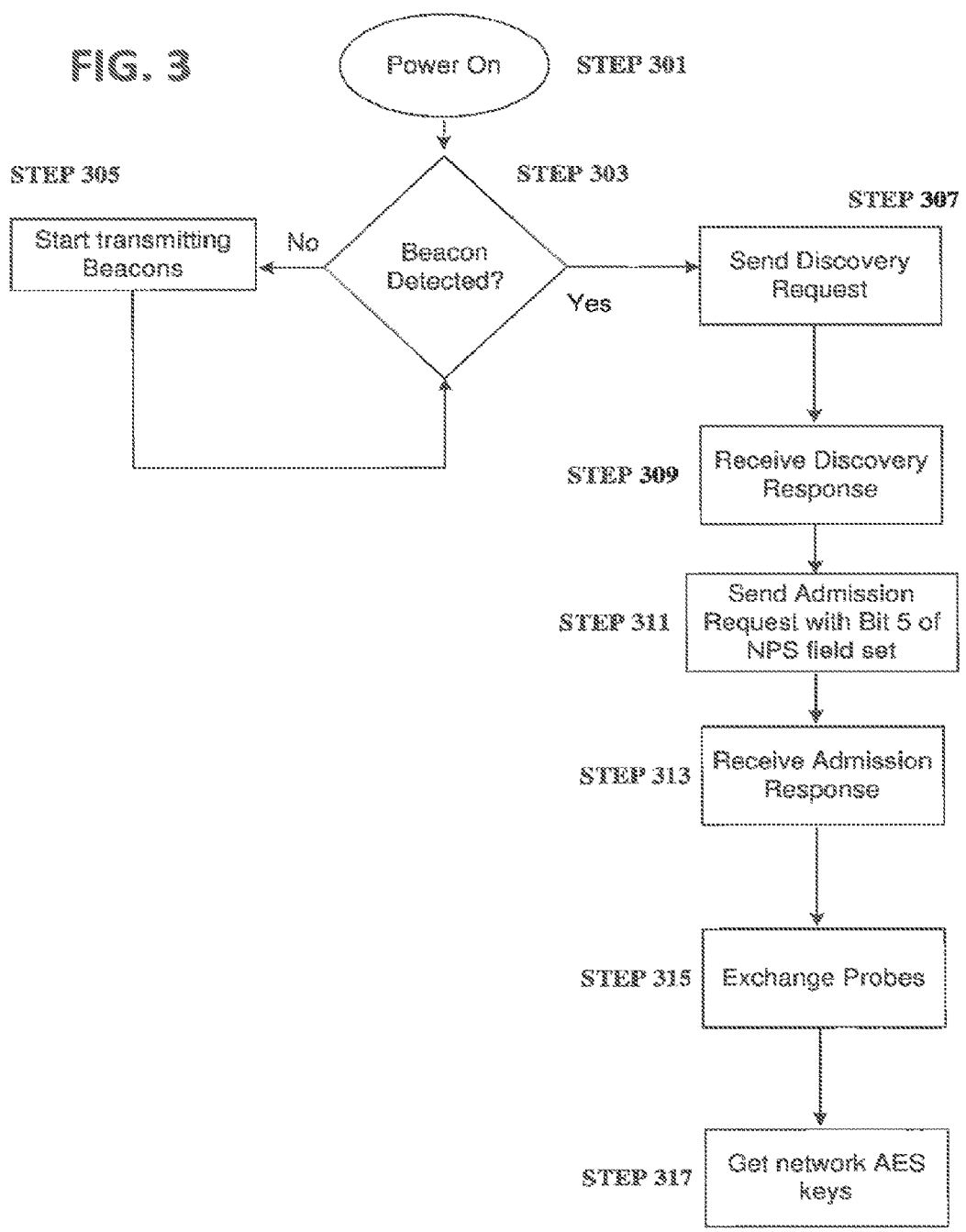
FIG. 3 is a simplified flowchart of the process implemented by a node in the role of a New Node (NN) when first powered up in accordance with one embodiment of the disclosed method and apparatus.

FIG. 3 is a simplified flowchart of the process implemented by a node 200 in the role of a New Node (NN) when first powered up. A MoCA network is formed when a NN is connected to the medium (typically a coaxial cable installed in a home or other facility) and the NN is "Powered up" (STEP 301). After initialization/power up, the NN performs a network search of each of its supported bands (i.e., the frequencies that the node 200 is capable of using to communicate with other MoCA nodes). The NN will perform the network search procedure to determine whether any other node is already operating on the medium in a supported band. The NN does this by listening for a Beacon message (hereafter, referred to simply as a Beacon for the sake of brevity) (STEP 303). If the NN fails to detect a Beacon, the NN will form a new network and begin transmitting Beacons of its own while waiting for another NN to attempt to join its network (STEP 305).

In one embodiment, networks formed on the medium can have network privacy enabled. Network privacy is implemented with four Advance Encryption Standard (AES) keys for the main network: two static keys used for MAC control and initial link privacy exchange, and two dynamic keys used for data privacy and link privacy. These four keys are specified in Table 3. When sub networks exist, each sub network with privacy enabled has its own unique APMKInit static key and the two dynamic keys (APMK and ATEK).

TABLE 3

AES Keys Used in MoCA Privacy

| Key Type | Key |
| --- | --- |
| Static Keys | AES MAC Management Key (AMMK) |
| | Initial AES Privacy Management Key (APMKInitial) |
| Dynamic Keys | AES Privacy Management Key (APMK) |
| | AES Traffic Encryption Key (ATEK) |

If privacy is enabled for the main network in the newly admitted EN, the newly admitted EN needs to have the password in order to join. In accordance with one embodiment of the disclosed method and apparatus, nodes that support the AES keys, including the NC, derive the static AES keys AMMK and APMKInitial of the main network from the network password and the Permanent Salt. The Permanent Salt is a random string of 96 bits generated by the NC at the network startup time. It is used to derive two static AES keys: AMMK and APMKInit. It can be changed only when a MoCA Network is re-formed.

Figure 4:
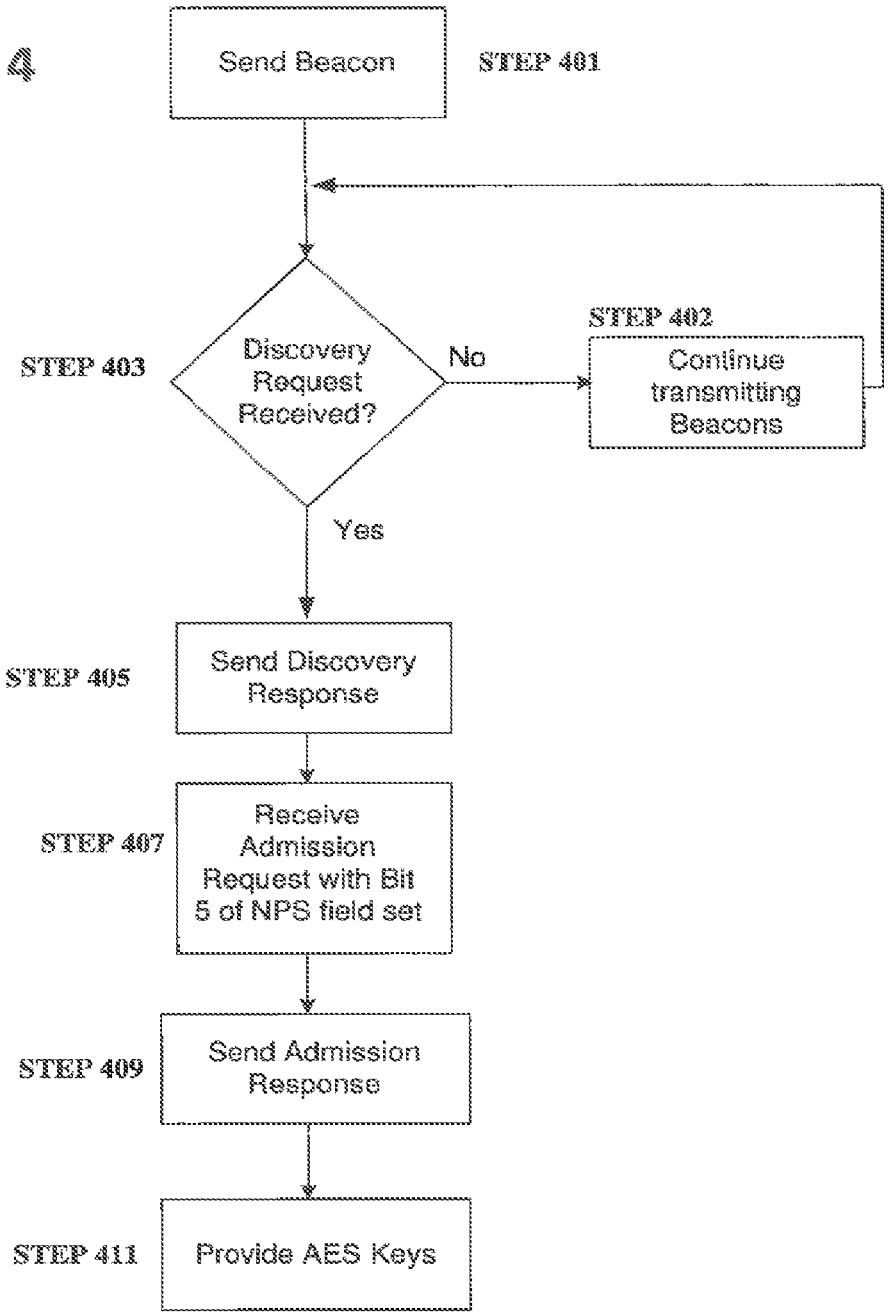
FIG. 4 is a simplified flowchart of the process implemented by an NC in response to a NN that implements the process shown in FIG. 3, in accordance with one embodiment of the disclosed method and apparatus.

FIG. 4 is a simplified flowchart of the process implemented by an NC in response to a NN that implements the process shown in FIG. 3. If an NC is already operating on the medium on which the NN is listening, the NC sends a Beacon (STEP 401). The NC continues to send Beacons (STEP 402) and carries on with normal operation of the network. When the NN detects the Beacon from the NC (STEP 303), the NN determines from information contained within the Beacon when to send a Discovery Request message. The NN then sends a Discovery Request message that includes either a Discovery Request Network IE or a Management Entity Request Network IE or both to the NC (STEP 307). The NC receives the Discovery Request message (STEP 403).

In response to the Discovery Request message, the NC sends a Discovery Response message (STEP 405). In accordance with one embodiment, the NC provides a Permanent Salt in the Discovery Response message. In one embodiment, the Permanent Salt is a random string of bits of a predetermined length generated by the NC at the network startup time. The Permanent Salt is used to derive two static AES keys: AMMK and APMKInit. In one embodiment, the Permanent Salt can be changed only when a network is re-formed. In one embodiment, before starting network admission, if privacy is Enabled (PRIVACY$_{EN}$=ENABLED), the NN receives the Permanent Salt from the NC in the Discovery Response message. In one embodiment, in which older nodes use DES keys and newer nodes use AES keys, a newer node will use the Permanent Salt to generate two static AES keys (AMMK and APM-KInit). In addition, two static DES keys are also generated (MMK and PMKInit). If privacy is enabled in the network, then once the Node has the Permanent Salt and the static keys it can participate in the security operations. It should be noted that the static keys (AMMK and APMKInit) are used in the admission process. Once the NN is admitted (becomes an EN), the APMKInit is used to exchange the Dynamic keys (APMK and ATEK) in a post-admission procedure.

Other information conveyed in the pre-admission discovery messages is not relevant to the presently disclosed method and apparatus and is known to those skilled in the art. After having exchanged the Discovery Request message and receiving a Discovery Response message (STEP 309), the NN will transmit an Admission Request message (STEP 311) during an Admission Control Frame (ACF) Slot scheduled by the NC in response to receiving the Discovery Response message. In accordance with one embodiment of the disclosed method and apparatus, the Admission Request message is encrypted with the static key derived from the Permanent Salt. In one embodiment, the Admission Request message will include in Bit 5 of a NODE_PROTOCOL_SUPPORT (NPS) field, an indication of whether the NN is a SPNC. An SPNC is capable of performing the functions of an NC in a network in which at least one sub network exists. It should be noted that an SPNC can be the network NC when there are no sub networks formed. However, no sub networks may exist before an SPNC becomes the NC. An SPNC can schedule and support admission of Flows within the sub networks and ensure that the allocation of bandwidth between the main network and the sub networks is maintained.

In one embodiment of the disclosed method and apparatus, a NN may be able to support the functionality of an SPNC, however it will not declare itself as an SPNC unless required to do so by an Operator-Service Provider (OSP). In one embodiment, a Node declares itself as a SPNC by setting bit 5 of the NPS field in the Admission Request message (Table 1) in response to the Discovery Response message received from the NC. Table 1 is shown to provide context for the discussion of the use of Bit 5 of the NPS field. However, the content of Table 1 is well known to those skilled in the art, with the exception of the use of Bit 5 of the NPS field as disclosed herein. Therefore, for the sake of brevity, only the use of Bit 5 of the NPS field is discussed in detail.

Once the Node declares itself as a SPNC it is considered to be an SPNC for as long as it is in the network.

TABLE 1

Admission Request Frame Format

| Field | Length | Usage |
|---|---|---|
| MPDU Header | | |
| TRANSMIT_CLOCK | 32 bits | This value is the scheduled time derived from the corresponding Allocation Unit in the MAP. |
| PACKET_SUBTYPE | 4 bits | 0x1 - Admission Request |
| PACKET_TYPE | 4 bits | 0x2 - Link Control |
| VERSION | 8 bits | 0x01 |
| RESERVED | 8 bits | Reserved |
| SOURCE_NODE_ID | 8 bits | 0x00 |
| RESERVED | 8 bits | Reserved |
| DESTINATION_NODE_ID | 8 bits | 0x3F |
| PACKET_LENGTH | 16 bits | Indicates the length of the Packet |
| MPDU_CONTROL_INFORMATION | 32 bits | Indicates the MPDU control information. |
| HEADER_FCS | 16 bits | Value of the Frame Check Sum |
| Frame payload | | |
| MOCA_VERSION_NUMBER | 8 bits | 0x20 |
| TABOO_CHANNEL_START | 8 bits | RF channel number of the lowest frequency channel covered by the TABOO_CHANNEL_MASK |
| RESERVED | 8 bits | 0x00 Type I |
| RESERVED | 8 bits | 0x0; Type II |
| INITIAL_PWR_ADJUSTMENT_PRIMARY_CHANNEL | 8 bits | If the NC is a MoCA 1 node, 0x00 Else, A number between 0 and 30, indicating the power adjustment value by which the NC is to backoff from the maximum transmit power, in dBs, in the Primary Channel The backoff indicated by this field can be derived by listening to Discovery Response messages. |
| TABOO_CHANNEL_MASK | 24 bits | Bit value 1 = unusable channel by the node sending the Admission Request Frame MSB = lowest frequency in the range (corresponding to the TABOO_CHANNEL_START frequency). Each successive bit after the MSB represents a frequency 25 MHz higher than the previous bit. |

TABLE 1-continued

Admission Request Frame Format

| Field | Length | Usage |
|---|---|---|
| NODE_PROTOCOL_SUPPORT (NPS) | 32 bits | Bits 31:24 - MoCA version of the node (0x20)<br>Bits 23:11 - Reserved, Type III<br>Bit 10 - PHY-Level Concatenation capability bit<br>    0b1 - Node supports transmission and reception of concatenated payloads<br>    0b0 - Node does not support concatenated payloads<br>Bit 9 - Channel bonding capability bit<br>    0b1 - Node support channel bonding<br>    0b0 - Node does not support channel bonding<br>Bit 8:7 - 0b10, (Note: indicates to MoCA 1.1 nodes that node supports transmission/reception of 10 aggregated PDUs)<br>Bit 6 - Preferred NC bit<br>Bit 5 - Secured Preferred NC<br>Bit 4 - 0b1, (Note: indicates to MoCA 1 nodes that node is able to transmit a 256-QAM constellation)<br>Bit 3:0 - 0x7 Reserved Type I |
| GUID | 64 bits | 64 bit MAC address of the device |
| RESERVED | 24 bits | 0x00 Type I |
| INITIAL_PWR_ADJUSTMENT_BEACON_CHANNEL | 8 bits | A number between 0 and 30, indicating the power adjustment value by which the NC is to backoff from the maximum transmit power in dB in the Beacon Channel. The value might be derived by listening to Discovery Response frame |
| Payload FCS | | |
| PAYLOAD_FCS | 32 bits | Frame Check Sum payload |

Upon receipt of the Admission Request message (STEP 407), the NC attempts to decrypt the contents of the Admission Request message. If the contents can be interpreted, then the NC prepares and transmits an Admission Response message (STEP 409) (see Table 2). The Admission Response message includes information regarding all of the ENs within the network, including information indicating which of the ENs in the network are SPNCs. That is, the field listed as "For (i=0; i<NUMBER_OF_NODES; i++) {" indicates that each of the fields that follow until "}" are repeated once for each EN in the network with information previously provided by the EN identified in the NODE_ID field. Similarly, the field listed as "For (i=0; i<NUM_OF_M2_M3_NODES; i++) {" indicates that each of the fields that follow until the "}" are repeated for each EN in either Power State M2 (Standby) or Power State M3 (Sleeping) with information previously provided by the EN that is identified in the NODE_ID field. Each of the ENs and the NN receive the Admission Response message (STEP 313).

TABLE 2

Admission Response Format

| Field | Length | Usage |
|---|---|---|
| MPDU Header | | |
| TRANSMIT_CLOCK | 32 bits | This value is the scheduled time derived from the corresponding Allocation Unit in the MAP. |
| PACKET_SUBTYPE | 4 bits | 0x2 - Admission Response |
| PACKET_TYPE | 4 bits | 0x2 - Link Control |
| VERSION | 8 bits | 0x01 |
| RESERVED | 8 bits | Reserved |
| SOURCE_NODE_ID | 8 bits | Node ID of the source Node |
| RESERVED | 8 bits | Reserved |
| DESTINATION_NODE_ID | 8 bits | 0x3F (broadcast) |
| PACKET_LENGTH | 16 bits | Indicates the length of the Packet |
| MPDU_CONTROL_INFORMATION | 32 bits | If VERSION = 0x10 and PACKET_TYPE = Ethernet unicast/broadcast (0x3) and PACKET_SUBTYPE != Dummy MPDU (0x1)<br>Bits 31:12 - Reserved Type III<br>Bits 11-6 - Number of PDUs in the A-PDU MUST be greater or equal to one.<br>Bit 5 - Reserved Type III<br>Bit 4 - Retransmission Indicator<br>    1: BlockAck is requested for selective retransmission.<br>    0: BlockAck is not requested<br>Bits 3:0 - The priority of all the PDUs in this MPDU. |

TABLE 2-continued

Admission Response Format

| Field | Length | Usage |
|---|---|---|
| | | If VERSION = 0x00<br>   See "MoCA MAC/PHY SPECIFICATION v1.0",<br>November 2007<br>Otherwise, this field is Type III reserved. |
| HEADER_FCS | 16 bits | Value of the Frame Check Sum |
| Frame Payload | | |
| NUMBER_OF_NODES | 8 bits | Total number of Nodes (including the NC and the newly admitted Node) in Power Stale M0 and M1 in the network |
| ADMISSION_STATUS | 8 bits | 0x00 - Node admitted<br>Other values reserved |
| RESERVED | 8 bits | Type III |
| NUM_OF_M2_M3_NODES | 8 bits | Total number of Nodes in Power State M2 and M3 in the network |
| RESERVED | 16 bits | 0x0; Type I |
| MAX_TPC_ADJUSTMENT_BEACON_CHANNEL | 16 bits | Value representing the maximum backoff in unit of 3 dBs that the NC is capable of in the Beacon Channel. The value MUST be at least 10 when $TPC_{EN}$ = ENABLED. |
| ASSIGNED_NODE_ID | 16 bits | Node ID assigned to the new Node. |
| RESERVED | 8 bits | Type III |
| MAX_TPC_ADJUSTMENT_PRIMARY_CHANNEL | 8 bits | Value representing the maximum backoff in dB that the NC is capable of, in the Primary Channel of operation. The value MUST be at least 30 when $TPC_{EN}$ = ENABLED. |
| NODE_PROTOCOL_SUPPORT (NPS) | 32 bits | This field is copied from the new Node's Admission Request. |
| NODE_GUID | 64 bits | 64 bit MAC address of the new Node |
| For (i=0;<br>i<NUMBER_OF_NODES;<br>i++) { | | This iteration enumerates all Nodes in the network |
| RESERVED | 8 bits | 0x00 Type I |
| NODE_ID | 8 bits | Node ID of a node in the network. |
| RESERVED | 11 bits | Type III |
| CURRENT_POWER_STATE | 2 bits | Indicates the current Power State the node is in<br>   0b00 State M0<br>   0b01 State M1 |
| M1_TX_POWER_VARIATION | 3 bits | If CUREENT_POWER_STATE = 0b01 (M1)<br>Maximum additional possible variation in TX power of the Node is M1 Power State compared with M0 Power State<br>   0b000-0b110 (in dB)<br>   0b111 if is a reserved value<br>Else<br>   Reserved Type III. |
| NODE_PROTOCOL_SUPPORT (NPS) | 32 bits | This field MUST be identical to the NODE_PROTOCOL_SUPPORT field of the Admission Request transmitted by the existing nodes when they requested admission to the network. |
| NODE_GUID | 64 bits | 64 bit MAC address of the device |
| }<br>For (i=0;<br>i<NUM_OF_M2_M3_NODES;<br>i++) { | | |
| RESERVED | | Type III Reserved |
| NODE_ID | | Node ID of a node in the network. |
| RESERVED | | Type III Reserved |
| CURRENT_POWER_STATE | | Indicates the current Power State the node is in<br>   0b10 State M2<br>   0b11 State M3 |
| RESERVED | | Reserved Type III. |
| NODE_PROTOCOL_SUPPORT (NPS) | | This field MUST be identical to the NODE_PROTOCOL_SUPPORT field of the Admission Request transmitted by the existing nodes when they requested admission to the network. |
| NODE_GUID<br>} | | 64 bit MAC address of the device |
| | Payload FCS | |
| PAYLOAD_FCS | 32 bits | Frame Check Sum payload |

After receipt of the Admission Response message, the NN will begin the process of exchanging probes with the other ENs to build a characterization of the paths between the NN and each EN and the NC (STEP 315). The process of exchanging probes to characterize a MoCA network is well known to those skilled in the art.

After exchanging the probes and probe reports, the NN admission is complete. The network advances to Steady State. The Node is no longer referred to as a NN, but rather is then referred to as a "newly admitted EN". Once admission is complete, the NC sends the newly admitted EN the Dynamic AES keys necessary to communicate over the main network (STEP 411). The newly admitted EN receives the Dynamic AES keys from the NC (STEP 317).

Figure 5:
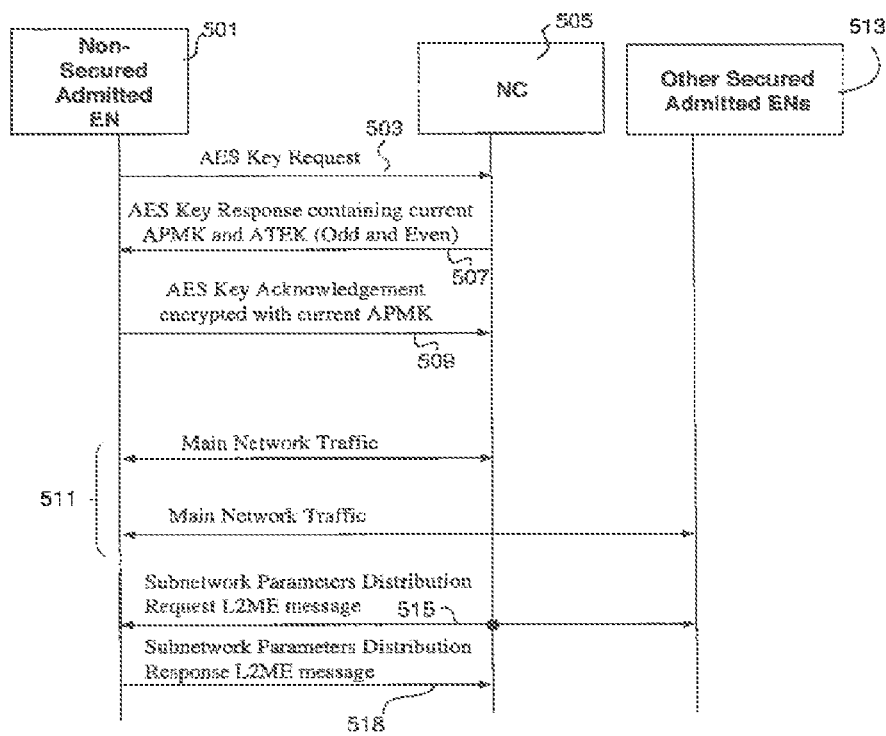
FIG. 5 is a simplified process diagram showing an admitted EN requesting and receiving Dynamic AES keys in accordance with one embodiment of the disclosed method and apparatus.

FIG. 5 is a simplified process diagram showing an admitted EN requesting and receiving Dynamic AES keys. The process begins with an admitted EN 501 (such as a newly admitted EN) sending an AES Key Request 503 to an NC 505. The request 503 is encrypted with the Initial AES Privacy Management Key (APMKInit). APMKInit is an AES key for encryption of Link Privacy messages when the APMK is unknown to the node (e.g., at initialization, reset or power cycle). In one embodiment, the APMKInit is an AES key for encryption of Link Privacy messages when key synchronization is lost with the NC. Table 4 shows the AES Key Request Frame Format.

TABLE 4

| Field | Length | Usage |
|---|---|---|
| AES Key Request Frame Format | | |
| MPDU Header | | |
| TRANSMIT_CLOCK | 32 bits | This value MUST be the scheduled time derived from the corresponding AU in the MAP. |
| PACKET_SUBTYPE | 4 bits | 0x3 - Key Distribution |
| PACKET_TYPE | 4 bits | 0x2 - Link Control |
| VERSION | 8 bits | 0x11 |
| RESERVED | 8 bits | Reserved |
| SOURCE_NODE_ID | 8 bits | Node ID of the Node sending this MPDU |
| RESERVED | 8 bits | Reserved |
| DESTINATION_NODE_ID | 8 bits | Node ID of the Node this MPDU is destined to, or Destination Flow ID. 0x3F when this MPDU is broadcasted to all nodes. 0x3E when in the following situations  VERSION = 0x00, PACKET_TYPE = 0x2, and this MPDU is broadcasted to all MoCA 2.0 Nodes only.  VERSION = 0x10, and the MPDU is broadcasted over the Beacon Channel. |
| PACKET_LENGTH | 16 bits | If PACKET_TYPE = MAP (0x0) and PACKET_SUBTYPE = MAP (0x0) and VERSION = 0x01 (This frame is the Extended Legacy MAP)  The total length of the first sub-frame in bytes (excluding the MPDU header). Else  The total length of the MPDU frame body in bytes (excluding the MPDU header). For the messages with constant payloads, the receiving Node MUST use this field only for the purpose of checking the FCS (and not for decoding the fields of the message). |
| MPDU_CONTROL_INFORMATION | 32 bits | If VERSION = 0x10 and PACKET_TYPE = Ethernet unicast/broadcast (0x3) and PACKET_SUBTYPE ≠ Dummy MPDU (0x1) Bits 31:12 - Reserved Type III Bits 11-6 - Number of PDUs in the A-PDU MUST be greater or equal to one. Bit 5 - Reserved Type III Bit 4 - Retransmission Indicator  1: BlockAck is requested for selective retransmission.  0: BlockAck is not requested Bits 3:0 - The priority of all the PDUs in this MPDU. If VERSION = 0x00 Otherwise, this field is Type III reserved. |
| HEADER_FCS | 16 bits | MPDU header Frame Check Sequence - MUST be calculated over the MPDU header starting from the TRANSMIT_CLOCK FIELD AND ENDING WITH (INCLUDING) THE MPDU_CONTROL_INFORMATION FIELD. THE HEADER_FCS MUST BE CALCULATED USING CRC-16 ($x^{16} + x^{15} + x^2 + 1$) |
| Frame Payload | | |
| TRANSACTION_TYPE | 8 bits | Type of transaction in the descriptor 0x01 = Key Request |

TABLE 4-continued

AES Key Request Frame Format

| Field | Length | Usage |
|---|---|---|
| SUB NETWORKS_MASK | 16 bits | If the SPNC distributed sub networks information: A bit mask representing the list of sub network IDs for which the AES keys are requested. LSB represents sub network ID 1. Otherwise: Reserved Type III |
| RESERVED | 8 bits | Type III Payload FCS |
| PAYLOAD_FCS | 32 bits | Frame Check Sum payload |

In one embodiment, each field of the AES Key Request is similar to the fields used in a MoCA 2.0 AES Key Request, with the exception of the SUB NETWORKS_MASK. The newly admitted EN provides a bit mask in the SUB NETWORKS_MASK field. The bit mask represents the list of sub network IDs for which the AES keys are being requested. Each bit in the field represents whether the newly admitted EN is requesting keys for the sub network represented by that bit. The Least Significant Bit (LSB) represents sub network having ID 1. The newly admitted EN 501 must first request the ATEK and APMK for the main network (i.e., setting the value of the SUB NETWORKS_MASK field to 0x00). The NC 505 responds to the request 503 by sending an AES Key Response message 507 with the ATEK and APMK for the main network.

Table 5 shows the AES Key Response Frame Format in one embodiment, the AES Key Response Frame Format is similar to that used for a MoCA 2.0 network, with the exception of two new fields. The first new filed is a SUBNET_ID field that indicates the ID of the sub networks for which the set of keys are to be used. In the response message 507, the value of the SUBNET_ID field is 0x00, indicating the response message 507 is associated with the main network. The second new field is a REQUEST_NODE_ID field that indicates ID of the EN requesting the keys. The response 507 contains the current APMK, and ATEK for the main network encrypted with the APMKInit for the main network.

TABLE 5

AES Key Response Frame Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x3 - Key Distribution - when sending keys to a Non-Secured Admitted Node<br>0x4 - Dynamic Key Distribution - For periodic update of keys |
| PACKET_TYPE | 4 bits | 0x2 - Link Control |
| VERSION | 8 bits | 0x11 |
| RESERVED | 8 bits | Reserved |
| SOURCE_NODE_ID | 8 bits | Node ID of the Node sending this MPDU |
| RESERVED | 8 bits | Reserved |
| DESTINATION_NODE_ID | 8 bits | Node ID of the Node this MPDU is destined to, or Destination Flow ID.<br>0x3F when this MPDU is broadcasted to all nodes.<br>0x3E when in the following situations<br>    VERSION = 0x00, PACKET_TYPE = 0x2, and this MPDU is broadcasted to all MoCA 2.0 Nodes only.<br>    VERSION = 0x10, and the MPDU is broadcasted over the Beacon Channel. |
| PACKET_LENGTH | 16 bits | If PACKET_TYPE = MAP (0x0) and PACKET_SUBTYPE = MAP (0x0) and VERSION = 0x01 (This frame is the Extended Legacy MAP)<br>    The total length of the first sub-frame in bytes (excluding the MPDU header).<br>Else<br>    The total length of the MPDU frame body in bytes (excluding the MPDU header).<br>For the messages with constant payloads, the receiving Node MUST use this field only for the purpose of checking the FCS (and not for decoding the fields of the message). |

TABLE 5-continued

AES Key Response Frame Format

| Field | Length | Usage |
|---|---|---|
| MPDU_CONTROL_INFORMATION | 32 bits | If VERSION = 0x10 and PACKET_TYPE = Ethernet unicast/broadcast (0x3) and PACKET_SUBTYPE ≠ Dummy MPDU (0x1) Bits 31:12 - Reserved Type III Bits 11-6 - Number of PDUs in the A-PDU is greater or equal to one. Bit 5 - Reserved Type III Bit 4 - Retransmission Indicator 1: BlockAck is requested for selective retransmission. 0: BlockAck is not requested Bits 3:0 - The priority of all the PDUs in this MPDU. If VERSION = 0x00 Otherwise, this field is Type III reserved. |
| HEADER_FCS | 16 bits | MPDU header Frame Check Sequence - MUST be calculated over the MPDU header starting from the TRANSMIT_CLOCK FIELD AND ENDING WITH (INCLUDING) THE MPDU_CONTROL_INFORMATION FIELD. THE HEADER_FCS MUST BE CALCULATED USING CRC-16 ($x^{16} + x^{15} + x^2 + 1$) |
| | | Frame payload |
| TRANSACTION_TYPE | 8 bits | Type of transaction in the descriptor 0x02 = Key Response |
| KEY_SET_ID | 8 bits | ID number of the set of keys included in this frame. The ID is selected by the NC. |
| SUBNET_ID | 4 bits | The ID of the sub network for which this set of keys apply. A value of 0x0 represents the main network. |
| REQUEST_NODE_ID | 8 bits | Node ID of the Node initiating this Key Request. |
| RESERVED | 4 bits | Type III |
| NODE_BITMASK | 32 bits | Bits corresponding to the node IDs of Nodes which MUST acknowledge this message by sending KEY_ACKNOWLEDGEMENT are set to '1' (LSB corresponds to node ID 0). |
| PMK_EVEN | 128 bits | APMK even key. This field is little endian word ordering |
| PMK_ODD | 128 bits | APMK odd key. |
| TEK_EVEN | 128 bits | ATEK even key. |
| TEK_ODD | 128 bits | ATEK odd key. |
| | | Payload FCS |
| PAYLOAD_FCS | 32 bits | Frame Check Sum payload |

In response to the NC 505 sending the AES Key Response message 507, the newly admitted node 501 sends an AES Key acknowledgement message 509 back to the NC 505 acknowledging that it received the main network keys. In one embodiment, the message 509 is encrypted with the APMK that the EN received from the NC 505 in the AES Key Response message 507. Once the EN 501 receives the main network AES keys, the EN starts using them to encode main network traffic 511 as indicated by a Main Network AES In-Use Flag within the MAPs sent by the NC 505. Table 6 shows the MAP MPDU Format for MAPS sent by the NC 505. In one embodiment, the NC 505 gives the newly admitted EN 501 time to communicate over the main network so the newly admitted EN 501 can authenticate itself. In one embodiment, the EN can get the passwords for the sub networks it intends to join. Furthermore, in one embodiment, the EN can get the passwords for the network that it intends to join ahead of time.

In one embodiment, the MAP MPDU format is the same as that of a MoCA 2.0 MAP, with the exception of Bit 15 and Bit 19 of the PARAMETER field. In one embodiment of the disclosed method and apparatus, Bit 15 is used to indicate whether an AES encryption is being used in the sub networks. Bit 19 is used to indicate whether the AES encryption is being used in the main network. In one embodiment, Bit 20 and Bit 21 are used to indicate whether an AES PMK encryption key and an AES TEK encryption key are in use for both the main network and the subnetwork. That is, these two bits will apply to both the main network and the subnetwork. Alternatively, different bits can be defined to indicate the active keys in subnetwork, leaving Bits 20 and 21 to indicate only for the main network.

TABLE 6

MAP MPDU Format

| Field | Length | Usage |
|---|---|---|
| MPDU Header | | |
| TRANSMIT_CLOCK | 32 bits | This value is the scheduled time derived from the corresponding Allocation Unit in the MAP. |
| PACKET_SUBTYPE | 4 bits | 0x0 - MAP |
| PACKET_TYPE | 4 bits | 0x0 - MAP |
| VERSION | 8 bits | 0x10 |
| RESERVED | 8 bits | Reserved |
| SOURCE_NODE_ID | 8 bits | Node ID of the Node sending this MPDU |
| RESERVED | 8 bits | Reserved |
| DESTINATION_NODE_ID | 8 bits | Node ID of the Node this MPDU is destined to, or DFID.<br>0x3F when this MPDU is broadcasted to all nodes.<br>0x3E when in the following situations<br>    VERSION = 0x00, PACKET_TYPE = 0x2, and this MPDU is broadcasted to all MoCA 2.0 Nodes only.<br>    VERSION = 0x10, and the MPDU is broadcasted over the Beacon Channel. |
| PACKET_LENGTH | 16 bits | Indicates the length of the Packet. This value cannot exceed N32*S1 bytes. |
| MPDU_CONTROL_INFORMATION | 32 bits | If VERSION = 0x10 and PACKET_TYPE = Ethernet unicast/broadcast (0x3) and PACKET_SUBTYPE != Dummy MPDU (0x1)<br>Bits 31:12 - Reserved Type III<br>Bits 11-6 - Number of PDUs in the A-PDU MUST be greater or equal to one.<br>Bit 5 - Reserved Type III<br>Bit 4 - Retransmission Indicator<br>    1: BlockAck is requested for selective retransmission.<br>    0: BlockAck is not requested<br>Bits 3:0 - The priority of all the PDUs in this MPDU.<br>If VERSION = 0x00<br>    See "MoCA MAC/PHY SPECIFICATION v1.0", November 2007<br>Otherwise, this field is Type III reserved. |
| HEADER_FCS | 16 bits | Value of the Frame Check Sum |
| Frame Payload | | |
| VALID_FROM | 32 bits | System time from which the MAP is valid, as a multiple of SLOT_TIMEs |
| VALID_TO | 32 bits | System time to which the MAP is valid, as a multiple of SLOT_TIMEs |
| PARAMETERS | 24 bits | Bits used as follows:<br>Bit 23 - PQoS Flow Policing Flag<br>    1 = Policing is ON for all PQoS Flows<br>    0 = No policing for PQoS Flows<br>Bit 22 - MAP transmission mode<br>    1 = Synchronous MAP transmission<br>    0 = Asynchronous MAP transmission<br>Bit 21 - AES TEK_encryption_key_flag<br>    1 = Odd AES TEK is in use<br>    0 = Even AES TEK is in use<br>Bit 20 - AES PMK_encryption_key_flag<br>    1 = Odd AES PMK is in use<br>    0 = Even AES PMK is in use<br>Bit 19 - AES In-Use flag<br>    1 = AES Encryption in use<br>    0 = AES Encryption not in use<br>Bit 18 - DES TEK_encryption_key_flag<br>    1 = Odd TEK encryption key is in use<br>    0 = Even TEK encryption key is in use<br>Bit 17 - DES PMK_encryption_key_flag<br>    1 = Odd PMK encryption key is in use<br>    0 = Even PMK encryption key is in use<br>Bit 16 - DES Encryption flag<br>    1 = DES Encryption enabled<br>    0 = DES Encryption disabled<br>Bit 15 - Sub networks AES In-Use flag<br>    1 = AES Encryption of sub networks in use<br>    0 = AES Encryption of sub networks not in use<br>Bits 14:0 - Reserved Type III |

TABLE 6-continued

MAP MPDU Format

| Field | Length | Usage |
|---|---|---|
| NUM_ELEMENTS | 8 bits | Bit 7 - Reserved Type III<br>Bits 6:0 - Number of AUs and IEs |
| RESERVED | 23 bits | Type III |
| LMO_FLAG | 1 bit | Indicator for LMO operation mode. Valid only during the regular LMO operation of MoCA 2.0 Nodes.<br>1 - The LMO Node MUST have OFDMA profiles with all the other MoCA 2.0 Nodes after the LMO.<br>0 - The LMO Node MUST NOT set up OFDMA profiles with all the other MoCA 2.0 Nodes During the LMO. |
| LINK_STATE_II | 8 bits | Informs nodes of the state of the network.<br>0x01 = Begin Node Admission State<br>0x02 = New Node Type I Probe TX State<br>0x03 = New Node Type I Probe RX State<br>0x04 = New GCD Distribution State<br>0x05 = Begin PHY Profile State<br>0x06 = Steady State<br>0x07 = Type III Probe State<br>0x08 = LMO Type I Probe State<br>0x09 = LMO Node GCD Distribution State<br>0x0A = Begin LMO PHY Profile State<br>0x0B = LMO GCD Type I Probe Link State<br>0x0C = Alternate Channel Quiet Line State<br>0x0D = Alternate Channel EVM Probe State<br>0x0F = Unsolicited Probe Report State<br>0x10 = Begin Unsolicited PHY Profile State<br>0x11 = Rx Determined Probe State<br>0x12 = Calibration State<br>Other values reserved. |
| NODE_BITMASK | 32 bits | In each bit position, the bit is set to "1" if the corresponding node is present in the network. (LSB corresponds to node ID 0).<br>Transition in the value of a bit from one MAP to next indicates that either of the following two cases<br>    A node was added or removed from the network<br>    A node was transitioned to or from Power States M2 or M3. |
| LMO_NODE | 16 bits | Node ID of the node that is the current LMO node when LINK_STATE_II is in the range TYPE_III_PROBE_STATE (0x07) to LMO GCD Type I Probe Link State (0x0B), and the node requesting the Alternate Channel Assessment LMO when LINK_STATE_II is either Alternate Channel Quiet Line State (0x0C) or Alternate Channel EVM Probe State (0x0D) |
| LMO_DESTINATION_NODE | 16 bits | The Broadcast Node ID (0x3F). |
| LOW_POWER_NODE_BITMASK | 32 bits | In each bit position, the bit is set to "1" if the corresponding node is in one of the following Power States: M1, M2, and M3, and "0" otherwise. (LSB corresponds to node ID 0).<br>Change in the value of a bit from one MAP to next indicates that a node was transitioned to or from Power States M1/M2/M3. |
| RESERVED | 32 bits | Type III |
| Allocation Elements | | |
| For (i=0, i<NUM_ELEMENTS, i++) { | | |
| AE ( ) | Variable | Elements can be one of -<br>    Data AU - 8 or 12 bytes long<br>    Link Probe AU - 16 bytes long<br>    Terminal AU - 8 bytes long<br>    IE - Variable length Information Element |
| } | | |
| Payload FCS | | |
| PAYLOAD_FCS | 32 bits | Frame Check Sum payload |

Having gained admission to the main network, the EN derives the keys for the sub networks. Each node that is a member of a sub network with privacy enabled derives the static AES key APMKInitial for the sub network from the sub network password and the Permanent Salt. When one or more sub networks exist, each sub network with privacy enabled has its own password that is shared by all nodes belonging to that sub network. The sub network password is used to derive static AES keys. The static keys are then used to encrypt and decrypt AES Key Request messages that carry the dynamic AES keys. The dynamic AES keys for the sub network are only used for sending data packets on the specific sub network for which the keys were generated.

All nodes in the network share the same network password when main network privacy is enabled.

As noted above, when sub networks exist, each sub network with privacy enabled has its own unique APMKInit static key and the two dynamic keys (APMK and ATEK). The NC 505 sends a Subnetwork Parameters Distribution Request L2ME message 515. The Subnetwork Parameters Distribution Request L2ME message 515 provides information about the sub networks to all of the ENs 501, 513 on the network, including the newly admitted EN 501. However, if there are no sub networks in the network, then the Subnetwork Parameters Distribution Request L2ME message 515 and the associated response message are not sent. In one embodiment, such L2ME messages can be used at any time to distribute sub network keys.

Table 7 shows the Request L2ME Frame Format. In accordance with one embodiment, the Request L2ME Frame Format is essentially the same as the Request L2ME frame format used by the well-known MoCA 2.0 protocol with the exception of the TRANS_TYPE field and the L2ME_PAYLOAD field. The TRANS_TYPE field provides an indication that the Request L2ME message 515 is a Subnetwork Parameters Distribution Request L2ME message in particular. The L2ME_PAYLOAD field is defined by Table 8 below.

TABLE 7

Request L2ME Frame Format

| Field | Length | Usage |
|---|---|---|
| L2ME Request Header | | |
| HDR_FMT | 8 bits | 0x09 |
| ENTRY_NODE_ID | 8 bits | The ID of the Entry node that submitted the transaction; 0xFF = no Entry node (i.e., the Transaction was initiated by the NC node). |
| ENTRY_INDEX | 8 bits | Copied from the initiating Submit message; 0x00 = no Entry node |
| WAVE_SEQ_N | 8 bits | An NC counter, which is held constant for all the L2ME Wave Cycles in an L2ME Wave, and is incremented when a new L2ME Wave starts. The NC node MUST increment this counter without resetting from the last L2ME Wave in an L2ME Transaction to the first L2ME Wave in the next L2ME Transaction in the network. |
| VENDOR_ID | 16 bits | Copied from initiating Submit or specified by the NC node if ENTRY_NODE_ID=0xFF |
| TRANS_TYPE | 8 bits | 0x04 = Device Discovery either copied from initiating Submit or specified by NC node if ENTRY_NODE_ID=0xFF<br>0x05 = Permanent Salt Distribution<br>0x06 = Sub networks Parameters Distribution |
| TRANS_SUBTYPE | 8 bits | Copied from initiating Submit or specified by NC node if ENTRY_NODE_ID=0xFF |
| WAVE_NODEMASK | 32 bits | If TXN_WAVE_N=0<br>    If there is an Entry node, copied from initiating SUBMIT field WAVE0_NODEMASK;<br>    otherwise specified by the NC<br>If (TXN_WAVE_N ≠ 0), see Section 2.2.3.2 of "MoCA MAC/PHY SPECIFICATION v1.1", January, 2013 |
| CYCLE_NODEMASK | 32 bits | The subset of WAVE_NODEMASK where the NC node requires a Response in this Wave Cycle; |
| WAVE_STATUS | 8 bits | Bits 7:3 reserved Type III<br>Bit 2: RESP_FAIL = 1 if response was not received from the requested node in previous Wave. This indicates that this is the last L2ME Wave due to transaction failure; otherwise = 0<br>Bit 1: 0 reserved Type III<br>Bit 0: FINAL_SUCCESS = 1 if the NC node declares this Wave as the last Wave with no errors; otherwise = 0 |
| DIR_LEN | 8 bits | 0x10 - If L2ME_PAYLOAD field has payload type "Concatenated", otherwise 0x00. |
| TXN_SEQ_N | 8 bits | A transaction sequence number, which is held constant for all the L2ME Waves in an L2ME transaction, and is incremented by the NC node when a new L2ME transaction starts |
| TXN_WAVE_N | 8 bits | Wave number within the L2ME transaction, starting with 0 for initial Wave, and incremented by 1 for each subsequent Wave. |

TABLE 7-continued

Request L2ME Frame Format

| Field | Length | Usage |
|---|---|---|
| | | L2ME Request Payload |
| L2ME_PAYLOAD | Variable length | If TRANS_TYPE = Device Discovery (0x04), Identical to the payload field of the Submit message with L2ME payload format for the Device Discovery Protocol. If TRANS_TYPE = Permanent Salt Distribution (0x05), a 96 bit random number If TRANS_TYPE = Sub networks Parameters Distribution (0x06), a format defined by Table 8. |

TABLE 8

L2ME Request Payload for Sub Networks Parameters Distribution

| Field | Length | Value |
|---|---|---|
| | | L2ME Request payload |
| N_SUBNETS | 8 bits | A value in the range of 0 to $N_{SN}$ representing the number of sub-networks in the network. A value of 0 indicates that no sub-networks are available in the network. Other values reserved. |
| RESERVED | 24 bits | Type III |
| For (i=0; i<N_SUBNETS; i++) { | | |
| SUBNET_NAME | 256 bits | A unique ASCII encoded string (up to 32 octets) per sub-network representing the name of the sub-network. This name is used to interface with the management system |
| SUBNET_ID | 8 bits | The NC assigned unique ID of the sub-network. MUST be >0 (a value of 0 is reserved for the main network). |
| RESERVED | 23 bits | Type III |
| SUBNET_PRIVACY | 1 bit | 0b0: Disabled 0b1: Enabled |
| SUBNET_NODEMASK | 32 bits | A bit set to 1 in the $j^{th}$ bit position indicates that the Node with Node ID j is a member of the sub-network, where the LSB corresponds to Node ID 0. |
| } | | |

As noted in Table 8, the first field (N_SUBNETS) of the Request Payload for Subnetworks Parameters Distribution Request message 515 indicates the number of sub networks that are available in the network. The second field is reserved (not currently defined for use). The following five fields are repeated for each of the sub networks, as indicated by the notation:

For (*i*=0;*i*<*N*_SUBNETS; *i*++){ }

This notation indicates that for each sub network, the fields between the brackets { and} (i.e., SUBNETS_NAME; SUBNET_ID: RESERVED; SUBNET_PRIVACY; and SUBNET_NODEMASK) provide information about the sub network identified by the fields SUBNETS_NAME and SUBNET_ID. In particular, in addition to the name and ID of each sub network, the Subnetworks Parameter Distribution Request message 515 provides information as to whether the privacy of each sub network is enabled or disabled, and which ENs are members of each sub network. The newly admitted EN 501 and each of the other ENs that are members of a sub network send a response 518 confirming receipt of the request 515. Table 9 shows the format for the Subnetworks Parameters Distribution Response message 518. If privacy is disabled on the sub network, the EN 501 can start sending packets over the sub network as soon as the EN 501 receives the Subnetworks Parameters Distribution Request message 515.

TABLE 9

Subnetworks Parameters Distribution Response

| Field | Length | Usage |
|---|---|---|
| | | Response L2ME Payload for Subnetworks Parameters Distribution |
| RESPONSE_CODE | 8 bits | RESPONSE_CODE_TRUE (0x01) - Subnetworks Parameters Payload was received successfully RESPONSE_CODE_FALSE (0x00) - Subnetworks Parameters Payload was NOT received successfully |
| RESERVED | 48 bits | Type III |

Figure 6:
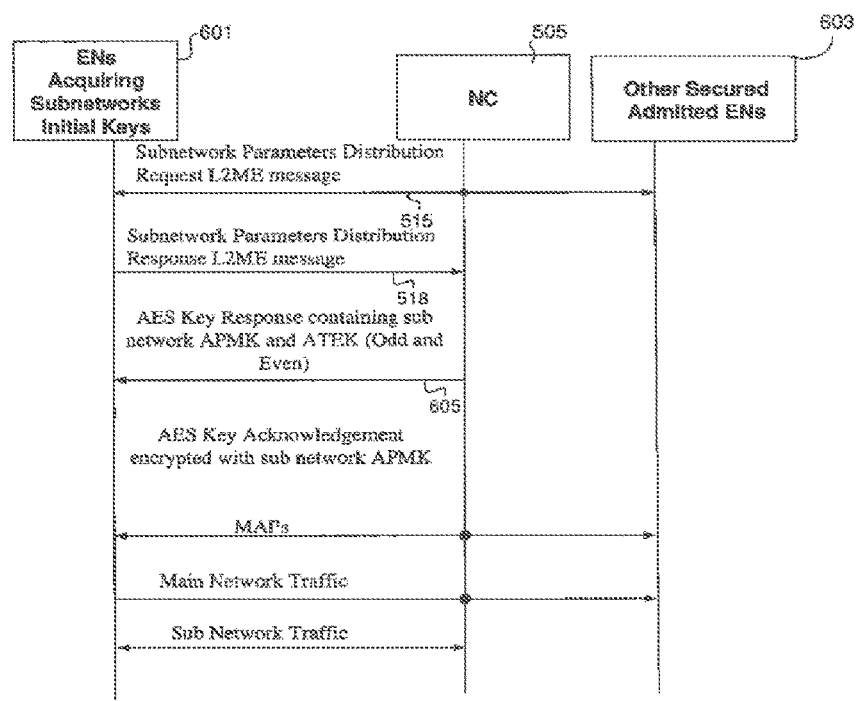
FIG. 6 shows the communication that occurs between an NC, ENs that are part of the sub networks for which information was provided in the Subnetworks Parameter Distribution message, and other ENs that are not current members of a sub network for which information was provided in the Subnetworks Parameter Distribution message in accordance with one embodiment of the disclosed method and apparatus.

FIG. 6 shows the communication that occurs between the NC 505, the ENs 601 that are part of the sub networks for which information was provided in the Subnetworks Parameter Distribution Request message 515, and other ENs 603 that are not current members of a sub network for which information was provided in the Subnetworks Parameter Distribution Request message 515. In particular, the communication shown relates to the initial acquisition of sub network keys (e.g., APMK and ATEK) of sub networks by an EN 601 when the NC 505 is an SPNC. The NC 505 will check whether the SUBNET_PRIVACY field of the Subnetworks Parameters Distribution Request message 515 sent by the NC 505 had the value "Enabled" for a sub network. If so, then the NC 505 waits a predetermined time before sending an AES Key Response message 605 to allow the EN time to generate the static keys (including the APMKInit used to encrypt the AES Key Response message). The AES Key Response message 605 carries the current APMK and ATEK keys used by the sub network.

In one embodiment, the entire AES Key Response message 605 is encrypted with the APMKInit of the specific sub network. In such an embodiment, a special Transmission Interval Element (TIE) is defined for scheduling the message for the keys of the sub networks. In one such embodiment, the NC 505 uses a Subnetworks Key Distribution TIE to schedule the transmission of AES Key Response message 605. Alternatively, the message is encrypted with the main network APMK and only the keys are encrypted with the APMKInit of the specific sub network. In such an embodiment, a special TIE would not be required for scheduling the message for the keys of the sub networks.

In one embodiment, if the NC 505 need only send the AES keys to one EN (e.g. following Node admission), the NC 505 can send the AES Key Response message 605 to that EN only using a unicast. Alternatively, the NC can broadcast the message 605.

If the NC broadcasts the AES Key Response message 605, each EN 601, 603 that meets the following criteria will receive the message:

The EN is a member of the sub network as indicated by the SUBNET_NODEMASK field of the Subnetworks Parameters Distribution message 515; or
The EN is an SPNC.

Each EN 601, 603 that receives the AES Key Response message 605 for a sub network sends an AES Key Acknowledgement message 607 back to the NC 505. In one embodiment, the message 507 is encrypted with the APMK that was included in the AES Key Response message 605 received from the NC 505. The receiving EN 601, 603 sends the AES Key Acknowledgement message 607 within a predetermined time of receiving the AES Key Response message 605 from the NC 505.

If the NC 505 does not receive the AES Key Acknowledgement message 607 from any of the ENs 601 in the sub network, the NC 505 resends the AES Key Response message 605. The NC 505 continues to send the message 605 until the NC 505 either receives the AES Key Acknowledgement message 607 from all the ENs 601 in the sub network or the NC 505 has sent the AES Key Response message 605 a predetermined number of times.

The NC 505 completes the distribution of the Dynamic AES keys for one sub network before starting the distribution of the Dynamic AES keys for the next sub network. In one embodiment, after completing the distribution of the Dynamic AES keys for all the sub networks, the NC 505 sets the AES In-Use flag associated with the sub networks in Bit 15 of the PARAMETERS field of MAP messages 609 that the NC 505 subsequently sends to activate security in the sub networks. Once the sub networks AES In-Use flag in the MAP 609 is set, each EN which is a member of a sub network starts using the sub network ATEK if the privacy of the sub network is enabled) to encode all traffic it sends over the sub network. In another embodiment this bit is not used and the ENs start using the new dynamic keys as soon as they get them from the NC.

The NC 505 keeps the Sub Networks AES In-Use flag set to a value of binary 0 (i.e., 0b0) if the privacy of all the sub networks is disabled. Once the newly admitted EN 501 sees a MAP in which the AES In-use Bit 15 is set to indicate that the sub network privacy is enabled and AES is in use, the EN 501 can start sending packets over the sub network. Since privacy is enabled and the AES in use bit is set, the packets that are sent by the EN 501 are encrypted with the AES of the sub network. If privacy is disabled on the sub network, the EN 501 can start sending packets over the sub network as soon as the EN 501 receives the Subnetworks Parameters Distribution Request message 515.

By establishing sub networks, network bandwidth can be allocated between the main network and the sub networks (taken as a group). In one embodiment, the allocation of bandwidth between the main network and the sub networks is controlled by the management entity 214 (see FIG. 2) associated with the NC through a single value maintained in the control parameter SN_BW. When an SPNC is the NC, the management entity 214 of the SPNC uses the value of the control parameter SN_BW to configure the portion of the overall available network bandwidth that the NC reserves for all the sub networks as a group. The remaining bandwidth will be available for sending data over the main network. In one embodiment, there is no separate allocation of bandwidth on a sub network by sub network basis.

In one embodiment, a node that is a member of one or more sub networks could be instructed by the associated management entity 214 to drop all data MSDUs sent to it over the main network. The management entity instructs the node by setting the managed parameter $SN\_MAIN\_NTWRK_{REC}$ to DROP. In response, the node drops all data MSDUs sent to it over the main network. Accordingly, the node will not forward such MSDUs to its ECL 206 (see FIG. 2). In one embodiment, the node ignores the value of $SN\_MAIN\_NTWRK_{REC}$ and receives data MSDUs sent to it over the main network when it is not a member of any sub network. In addition, in one embodiment, the number of sub networks in the network is controlled by the management entity 214 associated with the SPNC.

In one embodiment, each enabled sub network has a unique name and password that is known to the SPNC when it becomes the NC. In one embodiment, all the SPNCs in the network are provided the same information about all the sub networks in the network, including their related passwords. Furthermore, in one embodiment, an SPNC will not join any sub network unless it is instructed to do so through the parameter $SN\_MBRSHIP_{NODE}$ (even though it has the passwords of the sub networks). Still further, in one embodiment, no matter which sub networks the SPNC tries to join, the NC will deliver and the SPNC will maintain the AES keys of all the sub networks. This allows the switch of NCs from one SPNC to another without any security updates (similar to the case where privacy is enabled and there are no sub networks). In one embodiment, the SPNC manages the sub networks only when it is the NC.

Figure 7:
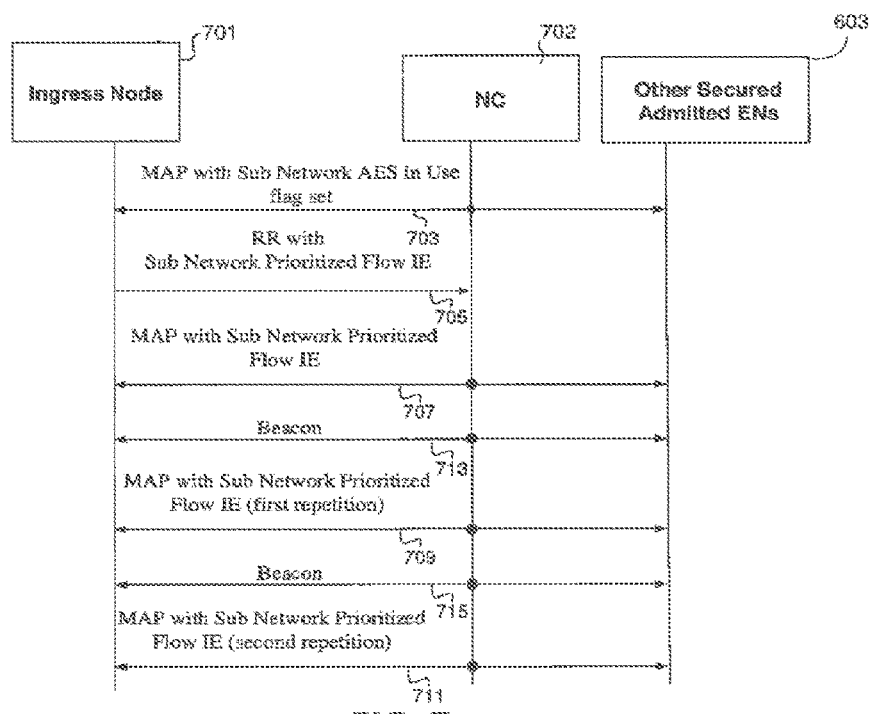
FIG. 7 is a process flow diagram showing how an Ingress Node admits a Prioritized Flow to a sub network in accordance with one embodiment of the disclosed method and apparatus.

FIG. 7 is a process flow diagram showing how an Ingress Node 701 admits to Prioritized Flow to a sub network. In one embodiment, the Ingress Node 701 will not try to admit a Flow to a sub network if privacy of the sub network is enabled until the NC 702 has sent a MAP 703 with the sub networks AES In-Use flag set. In an alternative embodiment, all sub networks, including those with no privacy (i.e., privacy disabled), may be used only after the NC 702 activates the sub networks in the MAP 703. In this case, rather than having a Sub Network AES In-Use flag in the MAP 703, the MAP 703 would have a Sub Network Active flag that indicates when all of the sub networks are active. A sub network for which privacy is enabled would only be active once the AES keys have been delivered.

In one embodiment, the Ingress Node 701 will only try to admit a Flow to a sub network if the node is a member of the sub network. The ingress Node 701 is considered a member of the sub network if the Node ID of the Node is included in the SUBNET_NODEMASK of the sub network in the Subnetwork Parameters Distribution Request L2ME message sent by the NC. The decision as to which Prioritized Flow the Ingress Node 701 should send over which sub network is controlled through a control parameter, $SN\_PR\_FLOW_{ASSIGN}$.

In one embodiment, admitting a Prioritized Flow is done by sending a Sub Network Prioritized Flow IE to the NC 702 in its Reservation Request (RR) 705. In another embodiment, the subnet ID is added to the RR itself. In this case, there is no need to admit the prioritized flows. Table 10 shows the format of the Sub Network Prioritized Flow IE.

TABLE 10

Sub Network Prioritized Flow IE Format

| Field | Length | Explanation |
|---|---|---|
| FRAME_SUBTYPE | 4 bits | 0xA - Sub network Prioritized Flow |
| FRAME_TYPE | 4 bits | 0x7 - Protocol IE |
| LENGTH | 6 bits | 0x01 |
| RESERVED | 2 bits | Type III |
| Protocol IE Payload | | |
| SUBNET_ID | 4 bits | The ID of the sub network of the Prioritized Flow |
| PRIORITY | 4 bits | The MoCA priority of the Prioritized Flow |
| SOURCE_NODE_ID | 8 bits | Node ID of the Node transmitting the MSDUs belonging to the Prioritized Flow (the requesting Node) |
| DESTINATION | 8 bits | If the Prioritized Flow is a Unicast Prioritized Flow<br>   Node ID of the receiving Node<br>If the Prioritized Flow is a Multicast Prioritized Flow<br>   DFID of the Flow |
| RESERVED | 7 bits | Type III |
| START_STOP | 1 bit | 0b0 - Start Subnetwork Flow<br>0b1 - Stop Subnetwork Flow |
| RESERVED | 22 bits | Type III |

The Sub Network Prioritized Flow IE includes the ID of the node from which MSDUs of the flow are to be sent. In addition, the Sub Network Prioritized Flow IE includes the destination of the MSDUs of the flow. The Sub Network Prioritized Flow IE also includes the MoCA priority. In one embodiment, a code is added for ALL (e.g. 0xF) to admit all data between the two nodes. Once sent, the Ingress Node 701 waits for the NC 702 to grant the RR 705. In one embodiment, the NC 702 will grant the request by including the Sub Network Prioritized Flow IE in the next MAP 707 if doing so would not violate the restrictions of the inclusion rules stated further below. If the NC 702 does not grant the request in the next MAP, the Ingress Node 701 will resend the request in a continued attempt to get the Flow admitted to the sub network (not shown in FIG. 7). After granting the request by sending the Sub Network Prioritized Flow IE in the MAP 707, the NC 702 will resend the Sub Network Prioritized Flow IE in the first MAP 709, 711 following each of the next two Beacons 713, 715. Since there is no acknowledgement associated with the IE, this increases the probability that the IE is received by all of the nodes. All MPDUs belonging to the Flow scheduled before the first MAP received by the ingress Node which includes the grant will be sent over the main network, and all MPDUs belonging to the Flow which are scheduled by that MAP and onward will be sent over the granted sub network. In one embodiment, the ME instructs the node not to send any data of this flow on the main network (i.e., to improve the security of the data).

The Ingress Node 701 encrypts all MPDUs belonging to a Prioritized Flow belonging to a sub network in which privacy of the sub network is enabled with the ATEK of the sub network. Alternatively, the Ingress Node 701 encrypts any MPDUs to be sent in a flow where the sub network privacy is disabled, but privacy of the main network is enabled with the ATEK of the main network, if privacy is disabled for both the sub network and the main network, then the MPDU will be sent in the clear.

In one embodiment, a node is capable of being the Egress Node for a predetermined number of Prioritized Flows being admitted to sub networks from each Ingress Node. The node is also capable of supporting being the Ingress Node for a predetermined number of Prioritized Flows being admitted to sub networks. In one embodiment, an Ingress Node can limit the number of admitted Prioritized Flows to the sub networks to a predetermined number per Egress Node. After reaching a limit, the Ingress Node will delete one of the admitted Flows before admitting a new Flow that includes that Egress Node in the DESTINATION field (including Multicast Prioritized Flows). To delete a Prioritized Flow from a sub network, the Ingress Node sends the Sub Network Prioritized Flow IE to the NC 703 in its RR with the Flow information and START_STOP set to a value of "Stop Sub network Flow". The Ingress Node 701 then waits for the NC 703 to grant the request. The NC 703 will grant the request by including the Sub Network Prioritized Flow IE in the MAP as soon as it can under the restrictions of the inclusion rules stated below. If the NC 703 does not grant the request in the next MAP, the Ingress Node will resend the request. After sending the Sub Network Prioritized Flow IE in the MAP, the NC 703 will resend the Sub Network Prioritized Flow IE in the first MAP following each of the next two Beacons. The Ingress Node 701 will stop sending MPDUs over the sub network from the first MAP it receives which includes the Sub Network Prioritized Flow IE.

The process used to admit a PQoS Flow in accordance with the disclosed method and apparatus is similar to the process used to admit a PQoS Flow in a MoCA 2.0 network. However, since the PQoS Flow can be associated with a particular sub network, a sub network identification field (SUBNET_ID) is provided in the L2ME_PAYLOAD for a Submit L2ME Frame for Create and Update PQoS Flow Transactions that allows the sub network to be identified. Table 11 provides the format for the L2ME_PAYLOAD.

TABLE 11

L2ME_PAYLOAD Field (PFP) for Subunit L2ME Frame for Create and Update PQoS Flow Transactions in MoCA 2.0

| Field | Length | Usage |
|---|---|---|
| Submit L2ME Payload for Create PQoS Flow and Update PQoS Flow | | |
| FLOW_ID | 48 bits | Unique identification number of the PQoS Flow. For PQoS Multicast Flows, this is set equal to the Multicast Ethernet MAC address. |
| RESERVED | 16 bits | 0x00; Reserved Type I. |
| T_PACKET_SIZE | 16 bits | Ethernet frame size in bytes (including the VLAN tag and excluding the FCS) used in the calculations of decision to admit or update the PQoS Flow. |
| RESERVED | 8 bits | Type III |
| INGRESS_NODE_ID | 8 bits | If TRANS_SUBTYPE =1<br>    Node ID for the Ingress Node of the PQoS Flow<br>Else<br>    Type III reserved |
| MAXIMUM_LATENCY | 8 bits | In units of ms with range of 1 ms to 255 ms.<br>0x00 indicates no value available for this field. |
| SHORT_TERM_AVERAGE_RATIO | 8 bits | If MAXIMUM_LATENCY ≥ 10 ms<br>    An unsigned integer value defined by the following equation: Short Term Average Rate (Kb/s) of the Flow over the interval of MAXIMUM_LATENCY = ((SHORT_TERM_AVERAGE_RATIO+1)/256) * T_PEAK_DATA_RATE with the constraint that the average rate ≤ T_PEAK_DATA_RATE.<br>Else<br>    Type III Reserved. |
| RESERVED | 8 bits | Type III |
| EGRESS_NODE_ID | 8 bits | If TRANS_SUBTYPE =1<br>    Node ID of the Egress Node of a Point-to-Point PQoS Flow;<br>    0x3F for a Multicast PQoS Flow;<br>Else<br>    Type III reserved |
| FLOW_TAG | 32 bits | Application specific content |
| PACKET_DA | 48 bits | If TRANS_SUBTYPE =1<br>    DA of Ethernet MSDUs of the PQoS Flow. It can be either a Unicast Ethernet MAC Address when both Ingress and Egress are MoCA 2.0 Nodes or a Multicast Ethernet MAC Address.<br>If TRANS_SUBTYPE = 2<br>    The FLOW_ID of this PQoS Flow |
| RESERVED | 24 bits | Type III |
| T_PEAK_DATA_RATE | 24 bits | 0 - 0xFFFFFE; Peak data rate (Kb/s)<br>0xFFFFFF = query data rate. PQoS Flow is not created. |
| T_LEASE_TIME | 32 bits | Lease time (seconds). |
| T_BURST_SIZE | 8 bits | Defined by TSPEC parameters |
| MAX_NUMBER_RETRY | 2 bits | Maximum number of retransmission attempts for each MSDU of the PQoS Flow. The range is 0-3.<br>0b00 = no retransmission requested |
| FLOW_PER | 2 bits | 0b00 - NPER (1e-6)<br>0b01 - VLPER (1e-8)<br>Other values reserved |
| RESERVED | 2 bits | Type III |
| INORDER_DELIVERY_RECOMMENDED | 2 bits | Indication of recommendation for Egress Node to deliver retransmitted MSDUs belonging to this PQoS Flow in order<br>0b00 - No information on in-order delivery is provided<br>0b01 - In-order delivery of MSDUs is not needed<br>0b10 - In-order delivery of MSDUs is recommended<br>0b11 - Reserved<br>The Egress Node MAY ignore this field or MAY use this field together with TRAFFIC_PROTOCOL for deciding on whether or not to deliver the received MSDUs of this PQoS Flow in order. |
| TRAFFIC_PROTOCOL | 3 bits | Type of traffic carried over this PQoS Flow:<br>0b000 - No traffic flow information is provided<br>0b001 - UDP<br>0b010 - TCP<br>0b011 - RTP over UDP<br>0b100 - MPEG2-TS over UDP<br>0b101 - HTTP over TCP<br>All other values are reserved |

TABLE 11-continued

L2ME_PAYLOAD Field (PFP) for Subunit L2ME Frame for Create and
Update PQoS Flow Transactions in MoCA 2.0

| Field | Length | Usage |
|---|---|---|
| INGRESS_CLASSIFICATION_RULE | 3 bits | If TRANS_SUBTYPE =1<br>Ingress Node classification rule for assigning MSDUs to the PQoS Flow:<br>0b000 - Classify using DA of Ethernet MSDUs and VLAN Tag with VLAN tag value being either 4 or 5 (the MoCA 1.1 classification).<br>0b100 - Classify using DA of Ethernet MSDUs only. Ignore VLAN and DSCP.<br>0b101 - Classify using DA & DSCP. VLAN tag MUST NOT be present,<br>0b110 - Classify using DA & VLAN only. Ignore DSCP.<br>0b111 - If VLAN tag is present classify using DA & VLAN, if VLAN tag is not present classify using DA & DSCP<br>Other values are reserved.<br>Else<br>Type III Reserved. |
| VLAN_TAG | 3 bits | If TRANS_SUBTYPE =1 and INGRESS_CLASSIFICATION_RULE = 0b110 or 0b111<br>The value that the VLAN tag of a MSDU needs to match for the MSDU to belong to the PQoS Flow.<br>Else<br>Reserved Type III |
| DSCP_MOCA | 3 bits | If TRANS_SUBTYPE =1 and INGRESS_CLASSIFICATION_RULE = 0b101 or 0b111:<br>The value of the three MSB of the DSCP Type of Service (TOS) field of a MSDU needs to match for the MSDU to belong to the PQoS Flow if VLAN tag is not present.<br>Else<br>Reserved Type III |
| SUBNET_ID | 4 bits | The ID of the sub network to which to assign the PQoS Flow. A value of 0x0 represents the main network. |

In one embodiment, a node can accept the creation of a PQoS Flow only when it can send or receive MPDUs belonging to the Flow. Hence, a Node will reject the creation of a PQoS Flow belonging to a sub network if the node has not received the Subnetwork Parameters Distribution Request L2ME message from the SPNC NC indicating the sub networks of which the Node is a member. In addition, the node will also reject the creation of the PQoS Flow if the privacy of the PQoS Flow sub network is enabled (as indicated by SUBNET_PRIVACY) and the Sub network AES In-use bit in the MAP has not been set yet.

In one embodiment of the disclosed method and apparatus, the NC 703 checks whether the sub network is capable of supporting a PQoS Flow before admitting the flow. In one embodiment, this is done by checking the QOS_STPS (slot time per second) conditions and QOS TXPS (flow transmission per second) conditions before a PQoS Flow can be admitted.

In one embodiment, QOS_STPS conditions are defined as:

(1−(Average of the total duration of the RRs per MAP cycle in units of ms+Average of the total duration of MAP(s) per MAP cycle in units of ms+Average of the total duration of miscellaneous control messages per MAP cycle in units of ms (=0.035)))*0.8/0.02.

QOS_TXPS conditions are defined as:

$10^6$*QOS_STPS/TMIN_TX_GAP, and TMIN_TX_GAP is defined as:
Minimum time between the starts of two consecutive PHY-frame transmissions in units of SLOT_TIME.

In accordance with one embodiment, the NC 703 admits or updates a candidate PQoS Flow only if all of the following QOS_STPS conditions and QOS_TXPS conditions are satisfied:

1) the resources required for all previously admitted PQoS Flows plus the candidate PQoS Flow (i.e., "the Summed up slot time per second (STPS)") is less than or equal to:
   a. the total resources allocated for all PQoS Flows (i.e., "QOS_STPS"), if the NC is not an SPNC;
   b. the total resources allocated to PQoS Flows admitted in all sub networks plus the resources required for the candidate PQoS Flow is less than the total resources allocated to PQoS Flows in the sub networks (i.e., the total resources allocated for PQoS Flows, times the proportion reserved for use by the sub networks) (i.e., QOS_STPS*SN_BW), if the NC is an SPNC and the PQoS Flow is assigned to a subnetwork (SUBNET_ID>0);
   c. The resources allocated to PQoS Flows minus the resources allocated to sub network PQoS Flows (i.e., QOS_—STPS*(1−SN_BW)), if the NC is an SPNC and the PQoS Flow is assigned to the main network (SUBNET_ID=0);

2) the Summed up TXPS (flow transmission per second) is less than or equal to:
   a. QOS_TXPS, if the NC is not an SPNC;
   b. QOS_TXPS*SN_BW, if the NC is an SPNC and the PQoS Flow is assigned to a subnetwork (SUBNET_ID>0);
   c. QOS_TXPS*(1−SN_BW), if the NC is an SPNC and the PQoS Flow is assigned to the main network (SUBNET_ID=0);

3) the Ingress Node can commit to a peak data rate greater than or equal to the peak data rate required for the flow, and if the TSPEC parameter MAXIMUM_LATENCY≥10 ms, the short term average data rate ratio to the T_PEAK_DATA_RATE that this node can commit to this PQoS Flow for the requested PQoS Flow's T_PACKET_SIZE is greater than or equal to the value of SHORT_TERM_AVERAGE_RATIO;
4) All Egress Nodes can commit to a peak data rate greater than or equal to the peak data rate required for the flow, and if the TSPEC parameter MAXIMUM_LATENCY≥10 ms, REM_SHORT_TERM_AVERAGE_RATIO greater than or equal to SHORT_TERM_AVERAGE_RATIO.
5) All Egress Nodes can commit to supporting the value of T_BURST_SIZE or higher. T_BURST_SIZE is a TSPEC parameter defamed in "MoCA MAC/PHY SPECIFICATION v1.1", January, 2013.

In accordance with one embodiment, when a node transmits an MPDU belonging to a PQoS Flow belonging to a sub network and the privacy of the sub network is enabled, the node will encrypt the MPDU with the ATEK of the sub network. If the privacy of the sub network is disabled, but privacy is enabled in the main network, the node will encrypt the MPDU with the ATEK of the main network. If privacy is disabled for both the main network and the sub network, the MPDU will be sent in the clear.

In one embodiment, upon reception of an RR and Opportunistic Reservation Request (ORR) element from all requesting nodes, the NC will select which Control and Data Request Elements (REs), including Protocol IEs, are scheduled within the next MAP cycle in the following Levels of Inclusion Order (i.e., priority is given to those indicated closer to the top of this list before those below):
1. Non-BlockAck Protocol IEs;
2. RR elements for Low Latency Flows;
3. Control REs (including at most one Probe request); The Probe request is be selected from all the probe requests according to the following order and in one embodiment, meets the time interval requirement on two consecutive probes:
   a. Link Probe REs with FRAME_SUBTYPE other than 0xA (Loopback Probe) or 0xB (Silent Probe), OFDMA Probe Request IE, and Alternate Channel Assessment Request IE;
   b. Link Probe REs with FRAME_SUBTYPE=0xA or 0xB
4. BlockAcks for PQoS Flows;
5. RR elements for Nominal Latency Flows and Latency Tolerant Flows;
6. For odd MAPs and elements belonging to a sub network apply the following order as long as the total granted bandwidth is less than or equal to the next MAP cycle's available data bandwidth *SN_BW (i.e., the product of the available bandwidth and the sub network allotted bandwidth), and for even MAPs and elements belonging to the main network apply the following order as long as the total granted bandwidth is less than or equal to the next MAP cycle's available data bandwidth*(1−SN_BW):
   a. ORR elements for PQoS Flows as long as the total granted PQoS bandwidth is less than 80*SN_BW % (i.e., 80 percent of the bandwidth allotted to the sub networks) of the next MAP cycle's available data bandwidth if the MAP cycle is odd and less than 80*(1−SN_BW) % of the next MAP cycle's available data bandwidth if the MAP cycle is even. In one embodiment, the MAP cycle's available data bandwidth is defined as the sum of the durations in the MAP cycle available for data MPDU transmission including preamble and IFG of each data MPDU transmission (i.e., not counting time for control MPDUs and Probes);
   b. BlockAcks for Prioritized Flows;
   c. RR elements for Prioritized Flows:
      i. High Priority;
      ii. Medium Priority;
      iii. Low Priority;
      iv. Background Priority;
   d. ORR elements for PQoS Flows (i.e., any unselected elements remaining after selections at Level 6);
   e. ORR elements for Prioritized Flows:
      i. High Priori
      ii. Medium Priority;
      iii. Low Priority;
      iv. Background Priori
7. For odd MAPs and elements belonging to the main network and for even MAPs and elements belonging to a sub network apply the following order for the remainder (from step 6) of the next MAP cycle's available data bandwidth:
   a. ORR elements for PQoS Flows as long as the total granted PQoS bandwidth is less than 80% of the remainder of the next MAP cycle's available data bandwidth. The MAP cycle's available data bandwidth is defined as the sum of the durations in the MAP cycle available for data MPDU transmission including preamble and IFG of each data MPDU transmission (i.e., not counting time for control MPDUs and Probes);
   b. BlockAcks for Prioritized Flows;
   c. RR elements for Prioritized Flows:
      i. High Priority;
      ii. Medium Priority;
      iii. Low Priority;
      iv. Background Priority;
   d. ORR elements for PQoS Flows (i.e., any unselected elements remaining after selections at Level 6);
   e. ORR elements for Prioritized Flows:
      i. High Priority;
      ii. Medium Priority;
      iii. Low Priority;
      iv. Background Priority.
8. For odd MAPs and elements belonging to a sub network and for even MAPs and elements belonging to the main network apply the following order for the remainder (if any from step 7) of the next MAP cycle's available data bandwidth:
   a. ORR elements for PQoS Flows as long as the total granted PQoS bandwidth is less than 80% of the remainder of the next MAP cycle's available data bandwidth. The MAP cycle's available data bandwidth is defined as the sum of the durations in the MAP cycle available for data MPDU transmission including preamble and IFG of each data MPDU transmission (i.e., not counting time for control MPDUs and Probes);
   b. BlockAcks for Prioritized Flows;
   c. RR elements for Prioritized Flows:
      i. High Priority;
      ii. Medium Priority;
      iii. Low Priority;
      iv. Background Priority;

d. ORR elements for PQoS Flows (i.e., any unselected elements remaining after selections at Level 6);
e. ORR elements for Prioritized Flows:
  i. High Priority;
  ii. Medium Priority;
  iii. Low Priority;
  iv. Background Priority.

It can be seen that this scheduling allocates time for transmission of sub network elements up to the sub network bandwidth limit in odd MAP cycles and allocates time for transmission of main network elements up to the main network bandwidth limit in even MAP cycles. If there is MAP time remaining after allocation of the all of the sub network elements in the odd MAP cycles, then the remaining MAP time is allocated to main network elements. Likewise, if there is MAP time remaining after allocation of the all of the main network elements in the even MAP cycles, then the remaining MAP time is allocated to sub network elements. If any subnetwork elements still remain and are not allocated, then in the odd MAP cycles, the remaining subnetwork elements are allocated for the remaining MAP time and in the even MAP cycles, the remaining main network elements are allocated for the remaining MAP time.

In accordance with one embodiment of the disclosed method and apparatus, when a handoff or failover from a non-SPNC to an SPNC NC occurs, the new NC will perform the sub networks security initialization. In one embodiment, if both old NC and new NC are SPNCs, the new NC will use the same set of the sub network AES keys as these used by the previous NC for each of the sub networks.

Figure 8:
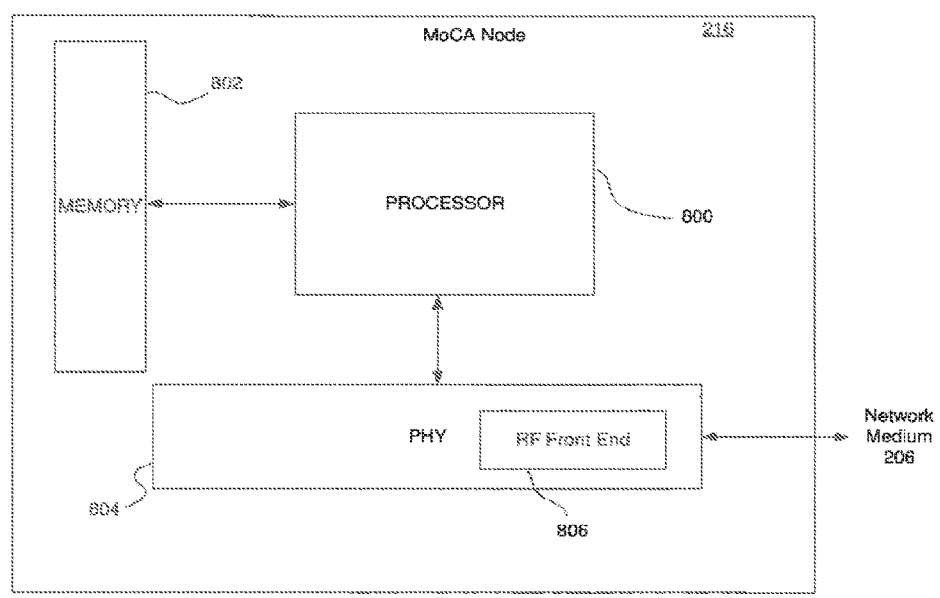
FIG. 8 is a simplified block diagram of the hardware used to implement a network node in accordance with one embodiment of the disclosed method and apparatus.

FIG. 8 is a simplified block diagram of the hardware used to implement a network node 200 in accordance with one embodiment of the disclosed method and apparatus. The node 200 comprises at least one processor 800, a memory 802, and a PRY 804. The memory 802 is coupled to the processor 800. The PHY 804 includes an RF front end 806. The PRY may also include a processor (not shown) that performs functions associated with the PHY 804. Alternatively, some control functions of the PRY 804 may be performed by the processor 800. In an alternative embodiment, the node 200 may have several processors that work together or independently. The processor 800 reads program code from the memory 802 and executes the code to perform the functions of the DLL 204. In an alternative embodiment, the processor 800 also implements the upper layers 212. In one embodiment, a management entity 214 (see FIG. 2) is implemented by the processor 800. In yet another embodiment, the management entity 214 is not co-located with the DLL 204. In one such embodiment, the management entity 214 is implemented using a different processor or multiple processors. Likewise, in one embodiment, the upper layers 212 are not co-located with the DLL 204. It should be clear that the particular physical layout of the logical components is not significant to the disclosed method and apparatus, so long as the disclosed functionality is possible. In an alternative embodiment, the functions of the DLL 204 and other functions disclosed herein are performed by dedicated hardware, firmware or a combination of hardware, firmware and software executed by a special or general purpose processor.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided, in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed, as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each find every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for establishing sub networks in a communication network having a main network, the method comprising:
    receiving an admission request message from a node, wherein the admission request messages comprises:
        at least a first bit that specifies whether the node is a preferred network coordinator (PNC); and
        at least a second bit, different from the first bit, that specifies whether the node is a secured and preferred network coordinator (SPNC) different from a PNC, wherein an SPNC is a node that is capable of concurrently performing the functions of a secured network coordinator of a main network of a premises and of performing the functions of a secured network coordinator of a sub network of the main network, wherein:

the main network comprises a first number of nodes and has a main network password; and the sub network comprises a second number of nodes, which is a subset of the first number of nodes, and has a sub network password different from the main network password; and in response to the admission request message, sending an admission response message to at least the node comprising information indicating which of the nodes in the network are secured and preferred network coordinators (SPNCs).

2. The method of claim 1, wherein the at least a first bit and the at least a second bit of the received admission request message are bits of a NODE PROTOCOL SUPPORT (NPS) field of the received admission request message.

3. The method of claim 1, comprising:

prior to receiving the admission request, receiving a discovery request message;

if privacy is enabled for a sub network of the main network and privacy is not enabled for the main network, sending a discovery response message including a Permanent Salt in response to the received discovery request message;

decrypting the received admission request with a static key derived from the Permanent Salt and a main network password; and sending the admission response message only if the contents of the received admission request could be interpreted after decrypting.

4. The method of claim 1, comprising sending dynamic sub network keys associated with at least one sub network, where the dynamic sub network keys are encrypted with a static sub network key derived from a Permanent Salt of the main network and a sub network password, different from the main network password, associated with the sub network with which the encrypted dynamic sub network key is to be used.

5. The method of claim 1, comprising sending dynamic sub network keys associated with at least one sub network within a response message, wherein the entire response message is encrypted with a static sub network key derived from a Permanent Salt of the main network and a sub network password, different from the main network password, associated with the sub network with which the encrypted dynamic sub network key is to be used.

6. The method of claim 4, wherein said sending dynamic sub network keys comprises:

receiving a key request message encrypted with the static sub network key; and sending a key response message in response to receipt of the key request message, the key response message including the encrypted dynamic sub network keys.

7. The method of claim 1, comprising sending on the network a subnetwork parameters distribution request message providing information about sub networks.

8. The method of claim 7, comprising:

receiving a sub network key response message carrying sub network dynamic keys, different from main network dynamic keys, for sub networks identified in the subnetwork parameters distribution request message, where the subnetwork key response message is encrypted with a sub network dynamic key;

sending a subnetwork key acknowledgement indicating that the subnetwork key response message was received; and sending a media access plan (MAP) message indicating that privacy is in use for the subnetworks.

9. The method of claim 1, comprising selecting a node that is an SPNC to perform a network coordinator (NC) function if the at least a second bit of the admission request message indicates that the node is an SPNC, the current NC is not an SPNC and an NC selection process is performed.

10. The method of claim 1, wherein the at least a second bit is only a single bit of the admission request message.

11. A node for utilization with a communication network, the node comprising:

an electrical circuit comprising:

a physical layer (PHY) comprising an interface that receives and sends information over a medium; and a processor coupled to the PHY, wherein the at least one electrical circuit operates to, at least:

receive an admission request message from a node, wherein the admission request message comprises:

at least a first bit that specifies whether the node is a preferred network coordinator; and at least a second bit, different from the first bit, that specifies whether the node is a secured and preferred network coordinator (SPNC) different from a PNC, wherein an SPNC is a node that is capable of concurrently performing the functions of a secured network coordinator of a main network of a premises and of performing the functions of a secured network coordinator of a sub network of the main network, where:

the main network comprises a first number of nodes and has a main network password; and the sub network comprises a second number of nodes, which is a subset of the first number of nodes, and has a sub network password different from the main network password; and in response to the admission request message, send an admission response message to at least the node comprising information indicating which of the nodes in the network are secured and preferred network coordinators (SPNCs).

12. The node of claim 11, wherein the at least a first bit and the at least a second bit of the received admission request message are bits of a NODE PROTOCOL SUPPORT (NPS) field of the received admission request message.

13. The node of claim 11, wherein the electrical circuit operates to:

prior to receiving the admission request, receive a discovery request message;

if privacy is enabled for a sub network of the main network and privacy is not enabled for the main network, send a discovery response message including a Permanent Salt in response to the received discovery request message;

decrypt the received admission request with a static key derived from the Permanent Salt and a main network password; and send the admission response message only if the contents of the received admission request could be interpreted after decrypting.

14. The node of claim 11, wherein the electrical circuit operates to send dynamic sub network keys associated with at least one sub network, where the dynamic sub network keys are encrypted with a static sub network key derived from a Permanent Salt of the main network and a sub network password, different from the main network password, associated with the sub network with which the encrypted dynamic sub network key is to be used.

15. The node of claim 11, wherein the electrical circuit operates to send dynamic sub network keys associated with at least one sub network within a response message, wherein the entire response message is encrypted with a static sub network key derived from a Permanent Salt of the main network and a sub network password, different from the main network password, associated with the sub network with which the encrypted dynamic sub network key is to be used.

16. The node of claim 14, wherein the electrical circuit operates to send the dynamic sub network keys by, at least in part, operating to:
receive a key request message encrypted with the static sub network key; and
send a key response message in response to receipt of the key request message, the key response message including the encrypted dynamic sub network keys.

17. The node of claim 11, wherein the electrical circuit operates to send on the network a subnetwork parameters distribution request message providing information about sub networks of the network.

18. The node of claim 17, wherein the electrical circuit operates to:
receive a sub network key response message carrying sub network dynamic keys, different from main network dynamic keys, for sub networks identified in the sub-network parameters distribution request message, where the subnetwork key response message is encrypted with a sub network dynamic key;
send a subnetwork key acknowledgement indicating that the subnetwork key response message was received; and
send a media access plan (MAP) message indicating that privacy is in use for the subnetworks.

19. The node of claim 11, wherein the electrical circuit operates to select a node that is an SPNC to perform a network coordinator (NC) function if the at least a second bit of the admission request message indicates that the node is an SPNC, the current NC is not an SPNC and an NC selection process is performed.

20. The node of claim 11, wherein the at least a second bit is only a single bit of the admission request message.

* * * * *